US007116878B2

(12) United States Patent
Zoorob et al.

(10) Patent No.: US 7,116,878 B2
(45) Date of Patent: Oct. 3, 2006

(54) OPTICAL WAVEGUIDE STRUCTURE

(75) Inventors: Majd Zoorob, Southampton (GB); Martin Charlton, Southampton (GB); Greg Parker, Hampshire (GB)

(73) Assignee: Mesophotonics Ltd., Southampton (GB)

(*) Notice: Subject to any disclaimer, the term of this patent is extended or adjusted under 35 U.S.C. 154(b) by 115 days.

(21) Appl. No.: 10/421,949

(22) Filed: Apr. 24, 2003

(65) Prior Publication Data
US 2004/0213536 A1    Oct. 28, 2004

(51) Int. Cl.
    G02B 6/10         (2006.01)
(52) U.S. Cl. ..................................... 385/129
(58) Field of Classification Search ........ 385/129–132, 385/14
    See application file for complete search history.

(56) References Cited
U.S. PATENT DOCUMENTS 6,134,043 A * 10/2000 Johnson et al. ............. 359/237
6,649,439 B1 * 11/2003 Nesnidal et al. ............. 438/32
6,853,789 B1 *  2/2005 Mekis et al. ................ 385/129

FOREIGN PATENT DOCUMENTS

JP      2001-4877 A * 1/2001 ................ 385/129
WO     WO 02/14913     2/2002

OTHER PUBLICATIONS

W.T. Lau et al, "Creating Large Bandwidth Line Defects by Embedding Dielectric Waveguides into Photonic Crystal Slabs" *Applied Physics Letters*, Vol. 81, No. 21, Nov. 2002, pp. 3915-3917.

B. D'Urso et al, "Modal Reflectivity in Finite-Depth Two-Dimensional Photonic-Crystal Microcavities" *Journal of the Optical Society of America*, vol. 15, No. 3, Mar. 1998, pp. 1155-1159.

(Continued)

*Primary Examiner*—Rodney Bovernick
*Assistant Examiner*—Mike Stahl
(74) *Attorney, Agent, or Firm*—Nixon & Vanderhye P.C.

(57) ABSTRACT

A waveguide structure (200) according to the invention comprises a core layer (210), a cladding layer (206) and a buffer layer (208). Sub-regions (204) are formed in the cladding layer (206) but not in the core layer (210). In one dimensional applications the sub-regions are slots: in two dimensional applications the sub-regions are rods. The rods or slots may be air-filled or filled with an in-fill material, (e.g. Si). The in-fill material, if present, enhances the contrast in dielectric constant between sub-regions (204) and the core layer (210).

Sub-regions (204) may furthermore be formed in the portion of the buffer layer neighbouring the core layer. Slots or rods in the buffer may be air-filled or filled by an in-fill material.

Substantially complete confinement of the mode in the core can be assured while still maintaining the ability to interact with the field within the photonic band structure region. Rather than perturb the majority of the field (which is confined in the core), it is possible to interact with the evanescent field in the cladding layer (or the buffer layer) without substantially affecting mode confinement.

52 Claims, 32 Drawing Sheets

OTHER PUBLICATIONS

M. Kafesaki et al, "Waveguides in Finite-Height Two-Dimensional Photonic Crystals" *Journal of the Optical Society of America*, vol. 19, No. 9, Sep. 2002, pp. 2232-2240.

D-S Song et al, "Single-Fundamental-Mode Photonic-Crystal Vertical-Cavity Surface-Emitting Lasers" *Applied Physics Letters*, vol. 80, No. 21, May 2002, pp. 3901-3903.

D. Onciul et al, "Analysis of Two-Dimensional Fibre Grating" *Optics Communications*, vol. 100, No. 1/4, Jul. 1993, pp. 93-98.

C. Kim et al, "Quality Factors in Single-Defect Photonic-Crystal Lasers With Asymmetric Cladding Layers" *Journal of the Optical Society of America*, vol. 19, No. 8, Aug. 2002, pp. 1777-1781.

* cited by examiner

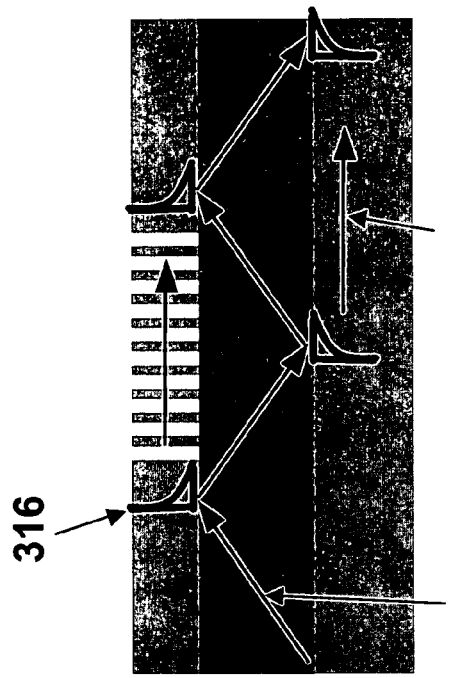
Figure 3A
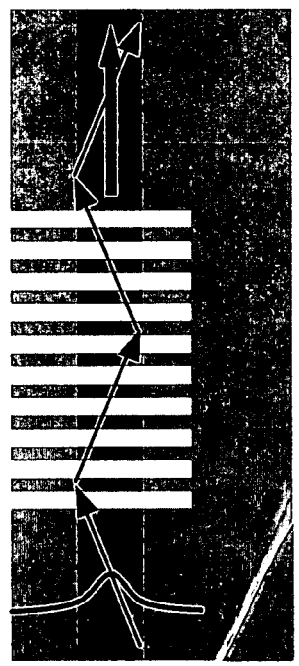
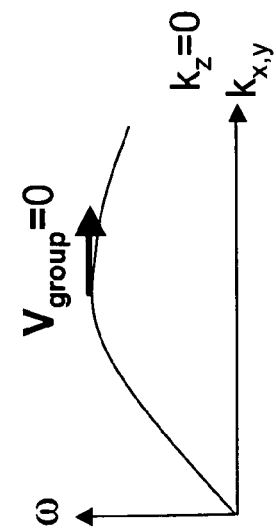
Figure 3B
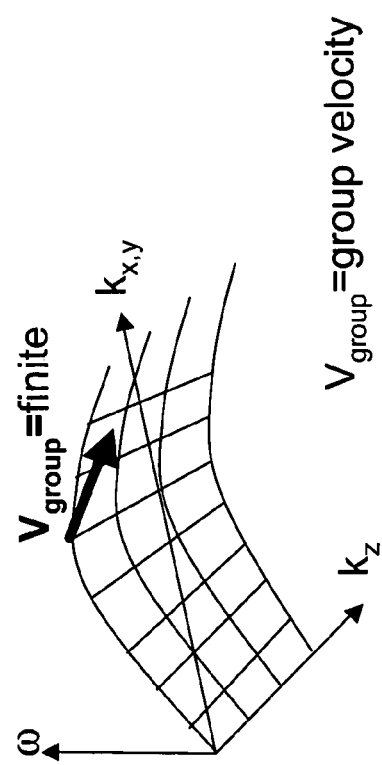

OPTICAL WAVEGUIDE STRUCTURE

FIELD OF THE INVENTION

The present invention relates to the field of optical devices and in particular but not exclusively to waveguide structures in Integrated optical circuits.

BACKGROUND TO THE INVENTION

It is increasingly recognised that integrated optical circuits have a number of advantages over electrical circuits. However, it has been difficult to produce integrated optical circuits which are comparably small, primarily due to the difficulty in producing waveguides which can include tight bends without large signal losses. It has also been difficult to produce integrated optical circuits including signal processing devices which can be easily coupled to current optical fibres, owing to a difference in the refractive index of the material used for optical fibres and those materials typically used for integrated optical devices, whilst still maintaining compact sizes.

Optical signals may be resonantly confined and manipulated using structures whose periodicity is of the same scale as an optical wavelength. Much recent interest has centred upon the field of photonic crystal (PC) waveguide structures.

Photonic elements may be incorporated in a range of different optical systems. Examples of appropriate optical systems include implementations in telecommunications, biosensors and optical storage media.

Photonic crystal waveguide structures are typically based on some perturbation in dielectric constant in the core of a planar waveguide structure. This has most commonly been performed by the spatially periodic etching of air rods through a cladding layer into the core layer of the waveguide. As light propagates through the core, it interacts with the dielectric constant modulation and, in some structures, in a manner analogous to electrons in a semiconductor, certain electromagnetic fields are forbidden to propagate in the core.

Electrons moving through a semiconductor lattice experience a periodic potential as they interact with the lattice nuclei via the Coulomb force. This interaction results in the formation of allowed and forbidden energy states. For pure and perfect semiconductors, no electrons will be found in an energy range called the forbidden energy gap or simply the band gap. However, the situation is different for real materials: electrons can have an energy within the band gap if the periodicity of the lattice is broken by, say, a missing silicon atom or by an impurity atom occupying a silicon site, or if the material contains interstitial impurities (additional atoms located at non-lattice sites).

Likewise, photons moving through a block of transparent dielectric material that contains a number of tiny air holes arranged in a lattice pattern also experience allowed and forbidden regions. The photons will pass through regions of high refractive index—the dielectric in the core layer—interspersed with regions of low refractive index—the air rods. This contrast in refractive index affects a photon just as a periodic potential would affect an electron travelling through a silicon crystal. Indeed, if there is large contrast in refractive index between the two regions then most of the light will be confined either within the dielectric material or the air rods. This confinement results in the formation of allowed energy regions separated by a forbidden region—the so-called photonic band gap Furthermore, by not including certain holes/slots in the lattice/slot region, a defect state waveguide can be formed. More detail on the nature of the band structure of photonic crystals of this sort can be found in WO 98/53351 (BTG International).

One dimensional (1D) photonic crystals comprising a region of equidistant air slots formed in a core material, such that a photonic bandgap (PBG) is present, are known. Two-dimensional (2D) photonic crystals comprising a lattice of air holes formed in a core material, typically silicon, have been fabricated, which exhibit a photonic bandgap.

PCs are typically manufactured through a combination of PECVD or LPCVD (or ion sputtering), e-beam lithography or pattern masking, dry etching and oxidization processes. Conventionally the core may be made of silicon nitride (or Silicon Oxynitride or $Ta_2O_5$ while the buffer layer and cladding layer which bound the core are made of silicon dioxide (but also Silicon Oxynitride).

It is also known to introduce a third material into air slots/rods, in order to reduce out-of-plane losses. These are discussed in more detail in our co-pending applications U.S. Ser. No. 10/196,727 (filed Jul. 17, 2002) and U.S. Ser. No. 10/287,825 (filed Nov. 5, 2002)

Confinement of light within the waveguide is provided by using light having a wavelength within the photonic bandgap wavelength range. However, it has been found that photonic crystal devices suffer from large losses, mainly due to the escape of light from the waveguide in a vertical direction. Furthermore, in order to provide a strong and complete bandgap at optical frequencies, it has been necessary to use a high refractive index material, typically silicon. This makes it difficult to couple light into the waveguides from existing optical fibres, which typically have a core having a much lower refractive index. This problem necessitates complicated, lossy mode coupling devices.

SUMMARY OF THE INVENTION

According to a first aspect of the present invention there is provided a planar waveguide structure having a core layer and a cladding layer, the cladding layer comprising a first region having a first refractive index, $n_{cladding}$, and an array of sub-regions formed therein having a second refractive index, $n_{sub}$, the array of sub-regions giving rise to a photonic band structure region which is effective to perturb an evanescent field of an optical signal propagating through the core layer, wherein the sub-regions do not extend into the core layer, and wherein an effective mode index contrast acting upon the optical signal as the signal passes through the photonic band structure region is greater than 0.1 percent.

By forming sub-regions in the cladding layer and not in the core layer, the large losses of light in the vertical direction can be substantially reduced.

Forming cladding-only sub-regions is particularly advantageous where the waveguide structure is to be implemented for multimoded optical signals. In waveguide structures having sub-regions through the core layer, the mode profile encountered can vary significantly depending upon which modes are present. Waveguides with sub-regions formed in cladding only will encounter only the evanescent tail of each mode profile. The variability in shapes of evanescent tails is far less than the variation encountered in the field profile of the guided mode in the core. Waveguides in accordance with this aspect of the present invention have less variation in their effect upon different modes, thereby allowing application to signals propagating along multimode optical waveguides.

The evanescent field is always perpendicular to the core/cladding interface, which allows the interaction of the field with the core/sub-region to be predicted accurately.

Furthermore, the formation of sub-regions in the cladding layer and not in the core layer makes it possible to probe zero-dispersion points (at the band edge) for large time delay effects.

When a structure is two-dimensional, the maxima and minima (which give rise to zero group velocity) can be coupled into with relative ease. The presence of sub-regions in the cladding layer only, and the resulting fact that the field is always evanescent and perpendicular to the sub-regions, means that the photonic band structure behaves like a two-dimensional structure. IF sub-regions were etched into the core, the waveguide would acquire a specific mode. This specific mode would propagate at a predetermined finite mode angle (out of plane component). In effect the finite mode angle alters the positions of the bands (and those of their maxima and minima too) within the photonic band structure.

Waveguides with sub-regions in the cladding layer only are an improvement upon conventional single moded PC waveguides. In the conventional waveguides, high power optical applications are difficult to implement where the core layer is too thin. Cladding layer-only sub-regions are less restricted by the thickness of the core layer in high power applications.

In planar waveguide structures, the contrast between the effective mode index in the locality of the sub-regions and the first region of cladding material surrounding the sub-regions determines the photonic band structure of the cladding PC. Effective mode index is a weighted measure of the degree to which the field confines in different layers of the waveguide. In the absence of a photonic crystal in the core, it is irrelevant to discuss the contrast between the refractive indices of the core and the sub-regions. Instead the relative degrees of confinement are measured through the comparison of the mode seeing the waveguide and then seeing a waveguide with a sub-region in the cladding. The evanescent field being perturbed in the sub-regions, results in a change in the effective mode index in the neighbourhood of the sub-regions (see the discussion of Table 1 for a worked example).

Knowing the values of certain parameters (including refractive index and thickness), it is possible to model the vertical confinement of light in such multilayer planar waveguides. In particular, one can calculate the expected value of the effective mode index contrast for any permutation of the initial parameters. In a preferred method of calculating the effective mode index contrast, transfer-matrix theory and complex number theory are used to derive a dispersion relation for an arbitrary multilayer planar waveguides. The singularity points of the dispersion relation correspond to the propagation characteristics of guided modes, i.e. the relationship between frequency and wavenumber for guided, vertically confined, modes. Knowing the wavenumber and frequency, the effective refractive index can be derived for different vertical lines through a planar waveguide. The effective mode index contrast of interest is the percentage difference between the mode seeing the waveguide away from sub-regions and the same mode seeing a waveguide in the presence of sub-regions in the cladding and/or buffer layers.

The sub-regions may be arranged in one dimensional or two dimensional arrays. The minimum effective mode index contrast of 0.1% is surpassed even with air filled sub-regions and can be substantially increased by forming the sub-regions from a material with a high refractive index, for instance silicon. As these two examples, air and silicon, show there are two regimes for which the refractive index of the sub-region material is different from the effective mode index of the waveguide. The sub-region may have a higher index than that of the effective mode index, as it does in the case of silicon. It is feasible that the sub-regions are composed of the same material as the core, for example silicon nitride, silicon oxynitride or tantalum pentoxide. Provided the effective index is significantly less than the refractive index of the core material the cladding PC will still function. By providing thin cores, a significant difference between the effective mode index of the core and the refractive index of the core material can be endured. The alternative regime covers the situation where the sub-regions have a lower refractive index than the effective mode index of the waveguide. Again a whole range of materials can be used provided that the refractive index for that material is lower than the effective index of the waveguide, for example air.

According to another aspect of the present invention, there is provided a planar waveguide structure having a core layer and a cladding layer, the cladding layer comprising a first region having a first refractive index, $n_{cladding}$, and a two-dimensional array of sub-regions formed therein having a second refractive index, $n_{sub}$, the sub-regions not extending into the core layer, the array of sub-regions giving rise to a photonic band structure which is effective to perturb an evanescent field of an optical signal propagating through the core layer.

According to a further aspect of the present invention, there is provided a planar waveguide structure having a core layer, a buffer layer and a cladding layer, the cladding layer comprising a first region having a first refractive index, $n_{cladding}$, and an array of sub-regions formed therein having a second refractive index, $n_{sub}$, which do not extend into the core layer, the array of sub-regions giving rise to a photonic band structure, the buffer layer having a third refractive index, $n_{buffer}$, wherein the materials of the cladding layer and the buffer layer are selected such that $n_{cladding} > n_{buffer}$, so that a field profile of an optical signal propagating through the core layer is asymmetric with respect to the core layer, and the photonic band structure region is effective to perturb an evanescent field of the optical signal.

The asymmetry between buffer and cladding layers enhances the influence of the photonic band structure over the evanescent field. The asymmetry forces a greater percentage of the in-plane evanescent component of the field into the cladding layer. This means that in order to have a given influence, a smaller number of rows of rods or slots need be provided than would be required in a symmetric waveguide structure.

The present invention is applicable to waveguides connecting integrated optical circuits as well as to individual optical devices that are used in integrated optical circuits. Any device incorporating waveguide bends in a glassy core layer can be improved by use of the present invention. More generally, the present invention can take advantage of the presence of dispersion bands in the cladding PC in application to devices that wholly replace functional optical elements. Such devices include Arrayed Waveguide Gratings (AWGs), Mach Zehnder interferometers, directional couplers, dispersion compensators, splitters/multiplexers, polarisation compensators, optical switches, optical delay elements and filters. So for example, in the case of the dispersion compensator, the band edge of the cladding PC is used to compensate for kilometres of fibre as opposed to the use of kilometres of negative dispersion compensating fibre (DSF).

In-filling sub-regions with a material having a higher refractive index than the effective mode index means that the dimensions required for the lattice pitch to produce a bandgap at a wavelength typically used, for example for telecommunications, can be much larger than in conventional photonic crystals. Furthermore, the cladding PC with sub-regions in-filled with higher refractive index material possesses a complete bandgap when embedded in a low index material (such as a glassy core material). Fabrication tolerances can be greatly increased because the sub-regions can be spaced further apart and each sub-region can be larger. Consequently, the waveguide of the present invention can easily be fabricated using conventional lithography. Air filled sub-regions typically require much higher precision lithography.

BRIEF DESCRIPTION OF THE DRAWINGS

Examples of the present invention will now be described in detail with reference to the accompanying drawings, in which:

FIGS. 3A and 3B allow a comparison between the mode angle of a cladding PC in accordance with the present invention and a conventional PC and the associated dispersion band diagrams;

DETAILED DESCRIPTION

Figure 1:
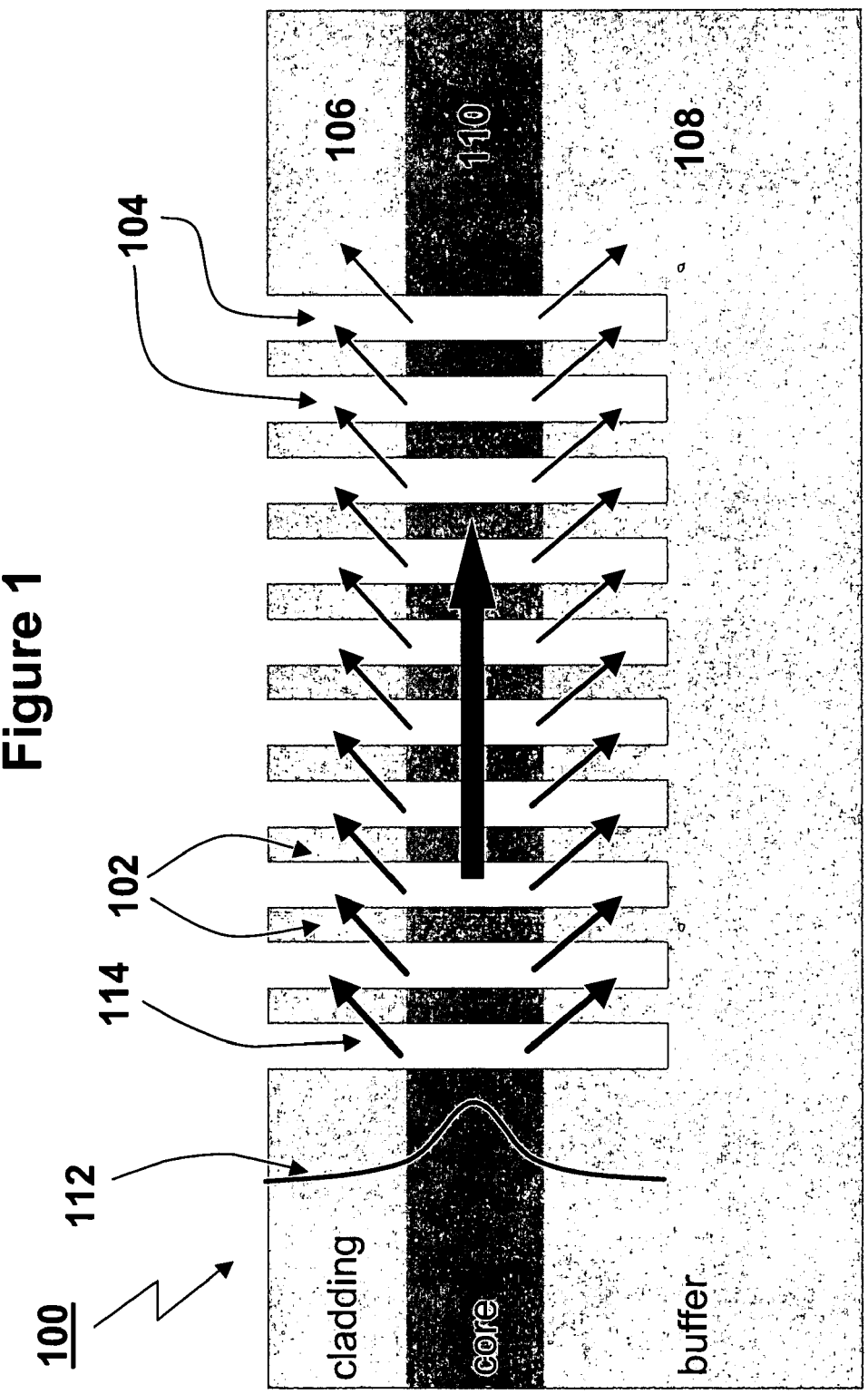
FIG. 1 shows a cross-sectional view of a photonic crystal (PC) embedded in a waveguiding structure in accordance with the prior art.

FIG. 1 shows a cross-sectional view of a conventional PC embedded in a waveguiding structure. A conventional PC waveguide structure 100 comprises: a core layer 110, through which the majority of incident light passes; a cladding layer 106, above the core layer; and a buffer layer 108, below the core layer. Sub-regions 104 extend through the cladding layer 106, the core layer 110 and partly into the buffer layer 108 beneath. The sub-regions are typically filled with air.

The curve 112 represents the field profile. The thick arrow proceeding from left to right represents the propagation of light along the core. The loss factor involved in the propagation of the light along the structure (caused by out-ofplane losses incurred at the air-dielectric interfaces) is represented by the strength of the arrows 114 directed out of the core. The mode confinement in the PC region is greatly reduced and hence the out-of-plane loss is increased.

The loss of mode confinement is due to the divergence of light at the interface between air and dielectrics. Although most of the light coupled back into the core away from the air filled sub-regions a significant proportion does not.

It is also noted since the structure is not symmetric and since the light is not well confined in the vertical direction, light prefers to leak into the buffer layer because of the higher index (compared to air).

The applicant has discovered that substantially complete confinement of the mode in the core can be assured while still maintaining the ability to interact with the field within the photonic band structure region. Rather than perturb the majority of the field (which is confined in the core), it has been found that it is possible to interact with the evanescent field in the cladding layer (or for that matter in the buffer layer) without substantially affecting mode confinement. This interaction can be achieved by forming a waveguide arrangement with a PC in the cladding layer alone and not penetrating the core itself.

Figure 2:
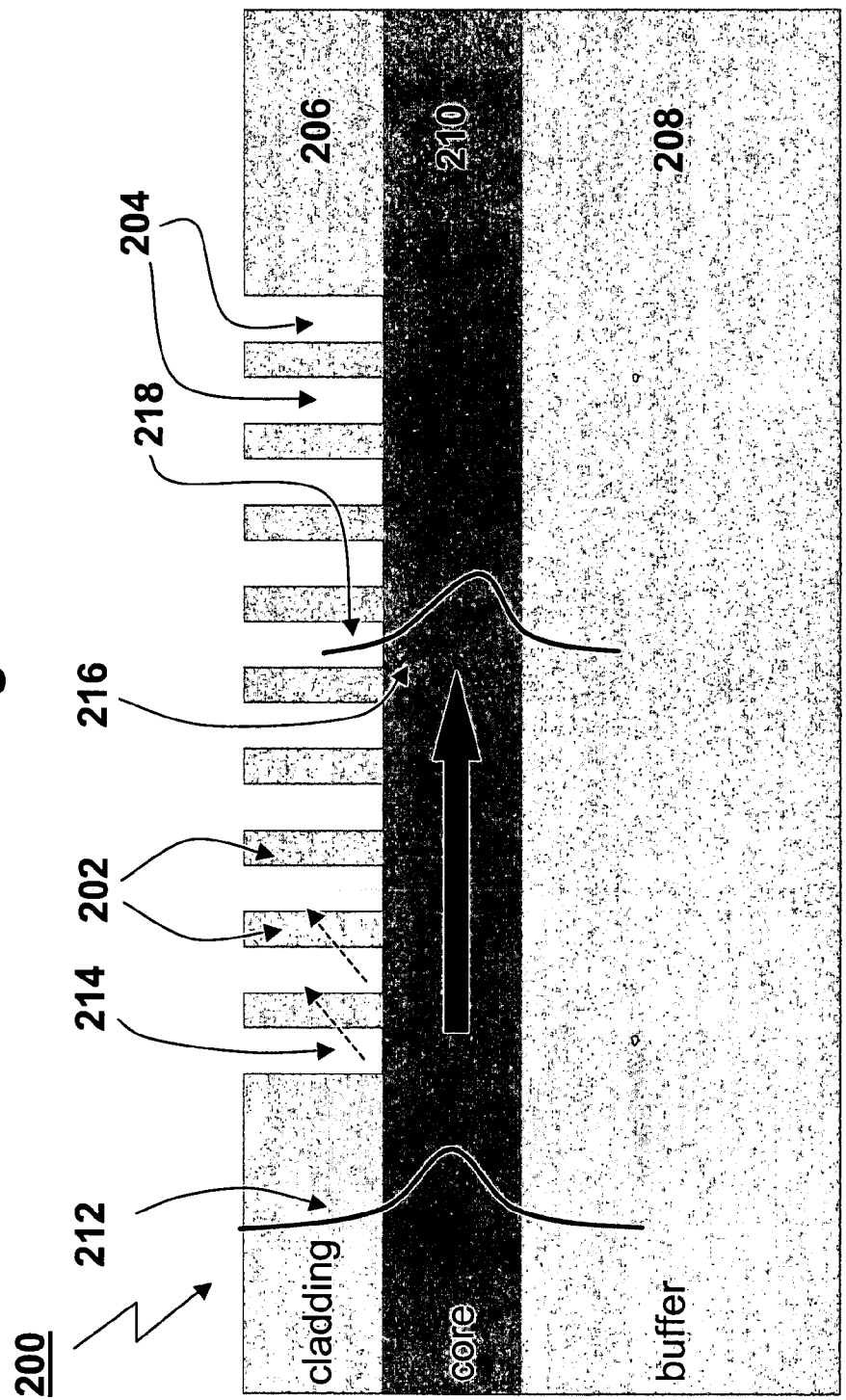
FIG. 2 shows a cross-sectional view of a cladding PC in a waveguiding structure in accordance with the present invention.

An example of a cladding PC waveguide structure 200 in accordance with the present invention is illustrated in more detail in FIG. 2. Here the waveguide structure 200 comprises a core layer 210, a cladding layer 206 and a buffer layer 208. Sub-regions 204 are formed in the cladding layer 206 but not in the core layer 210. The field profile 212,216 varies according to whether a core/cladding 202 or a core/sub-region 204 interface in the vertical direction is experienced. In the vicinity of a core/sub-region interface 204, the evanescent field tail 218 extends out a shorter distance into the sub-region medium due to the different field confinement regimes between the waveguide alone and the waveguide with the sub-region medium. Hence the presence of a core/sub-region interface 204 pushes the field further down into the core while still maintaining strong confinement.

Again the loss factor involved in the propagation of the light along the structure is represented by the strength of arrows 214 directed out of the core. The cladding PC waveguide structure is seen to reduce the loss factor significantly.

Furthermore, evanescent fields always propagate perpendicular to the core/cladding interface, which provides 2D in-plane behaviour. In this cladding PC arrangement, a 2D perturbation of the evanescent field could provide behaviour much closer to theoretical predictions giving rise to very long time delays, of the order of a few milliseconds.

Conventional PC behaviour is greatly affected by the mode angle in the core of the waveguide. The mode angle distorts the PC behaviour and the 3D dispersion behaviour of the PC in the core greatly reduces the extreme changes in the group velocity typically associated with the band edges.

In a two-dimensional structure, the wavenumber, k, has two non-zero components $k_x$ and $k_y$. At the maxima or minima, the group velocity, $v_g(x,y)=0$.

Three dimensional structures introduce a further waveguide dimension, thereby introducing a $k_z$ component. This $k_z$ component behaves differently with respect to frequency when compared with the frequency dependencies for $k_x$ and $k_y$. The $k_z$ typically behaves as it would in a waveguide, so that as the $k_z$ component is increased, the frequency increases (a phenomenon that arises from typical waveguide dispersion relations), hence indicating that $v_g(z)$ is non-zero.

When the $k_z$ is superimposed on the $k_x$ and $k_y$ there no longer exists a $k_x$ and $k_y$, for which $v_g(x,y,z)=0$, because the dispersion in the z direction of k always slopes gradually up in frequency and distorts the dispersion bands (in the x and y direction). Hence, the only way to probe the $v_g(x,y,z)=0$ for a PC embedded in a waveguide is to probe the true two dimensional nature of the structure, under which circumstances the field can only propagate in a true 2D nature. Evanescent fields only ever propagate normal to the PC rods (no $k_z$ component present), so the two dimensional nature of the structure can be probed by perturbing the evanescent field.

FIGS. 3A and 3B show a comparison of the mode angle of a cladding PC (CPC) waveguide arrangement (FIG. 3B) in accordance with the invention and a conventional PC waveguide arrangement (FIG. 3A). The figures also illustrate the associated dispersion band diagrams, relating the lowest band zero dispersion points for the different PCs, and showing the effect each arrangement has on the group velocity.

The use of a CPC presents some new challenges. It is noticed that due to the weaker interaction of the CPC and the field confined in the core, the PBG is much narrower. Moreover, to provide a similar extinction ratio to that of a conventional PC, many more rows or air rods are generally required.

Figure 4A:
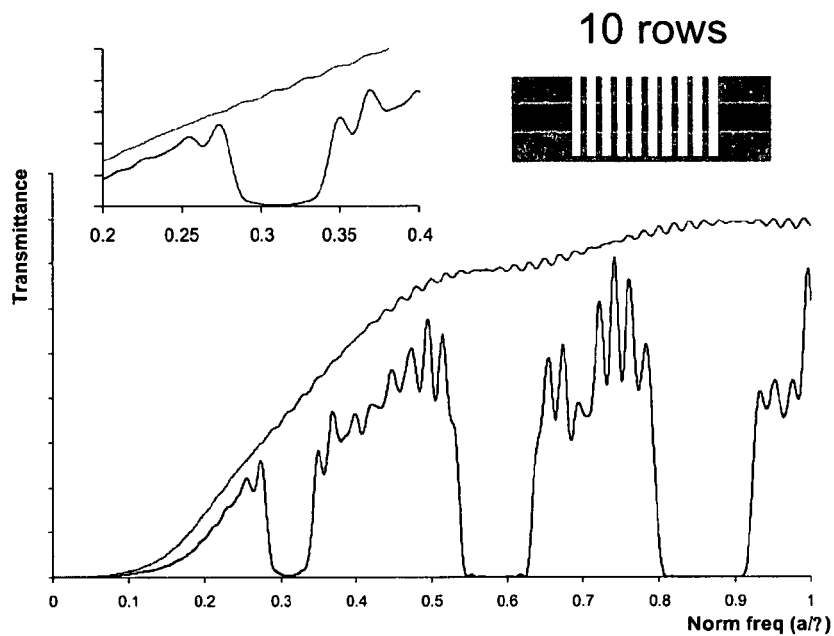
FIGS. 4A and 4B allow a comparison of TE mode simulations on PC structures, (a) shows a simulation for 10 rows etched into the core in accordance with the prior art while (b) shows a simulation performed for 200 rows etched into the cladding only PC in accordance with the present invention.
Figure 4B:
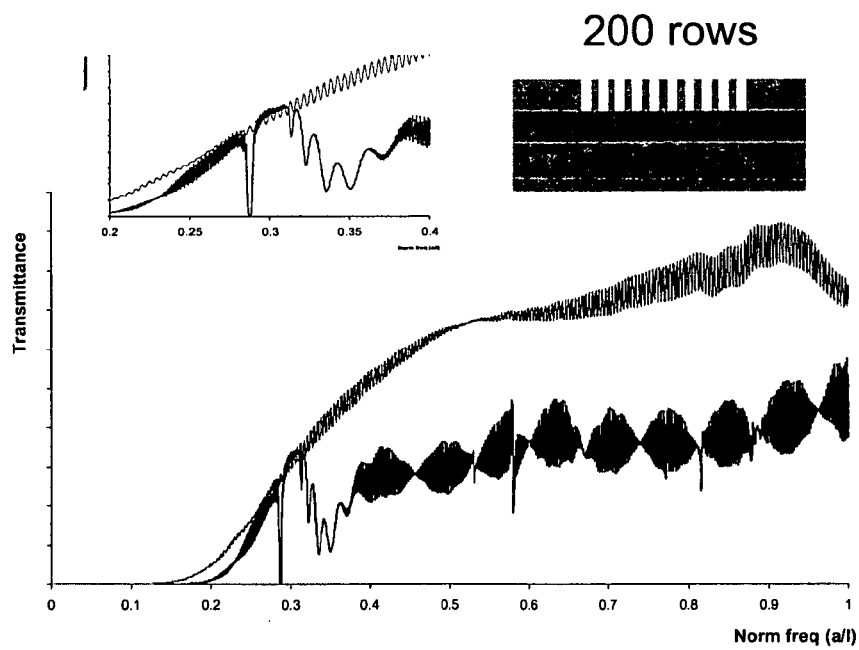

To illustrate the differences between structures similar to those in FIG. 1 and FIG. 2, a TE mode simulation was performed. For the purposes of the simulation the extinction ratio in the bandgap for the two different structures was kept the same. This can be performed by having different numbers of rows of rods in the conventional PC (10 rows) and cladding PC (200 rows). The resulting transmission graphs are shown in FIGS. 4A and 4B. In each graph, the top line indicates a control simulation where a waveguide with no PC is allowed to propagate light. The inset graphs in FIGS. 4A and 4B highlight the first bandgap region between 0.2 and 0.4 of the normalised frequency scale.

If the structures considered are lossless the transmitted light either side of the bandgap will follow the same slope shape as the control experiment but not necessarily the same absolute transmittance value. Under the conditions illustrated, it will be understood that at least one bandgap is present. The absolute transmittance depends on the total length of the control experiment but not necessarily the same absolute transmittance value. It is clearly visible that even with only 10 rows the loss experienced by the light either side of the primary bandgap (especially the higher frequency band edge) is greater than that experienced by 200 rows in the cladding PC structure.

It is also noted from these simulations that even though the extinction ratios in the bandgap region are not as high, and the bandgaps themselves are not as wide, when compared to regular PCs, the band edges are very sharp and well defined and hence can be used in time delay elements and filtering applications (where strong dispersion relations are used to filter different wavelengths: regions close to the band edge have this feature).

FIGS. 5–8, 10–13 and 21–28 show a variety of different planar waveguide structures in accordance with the present invention.

Figure 5:
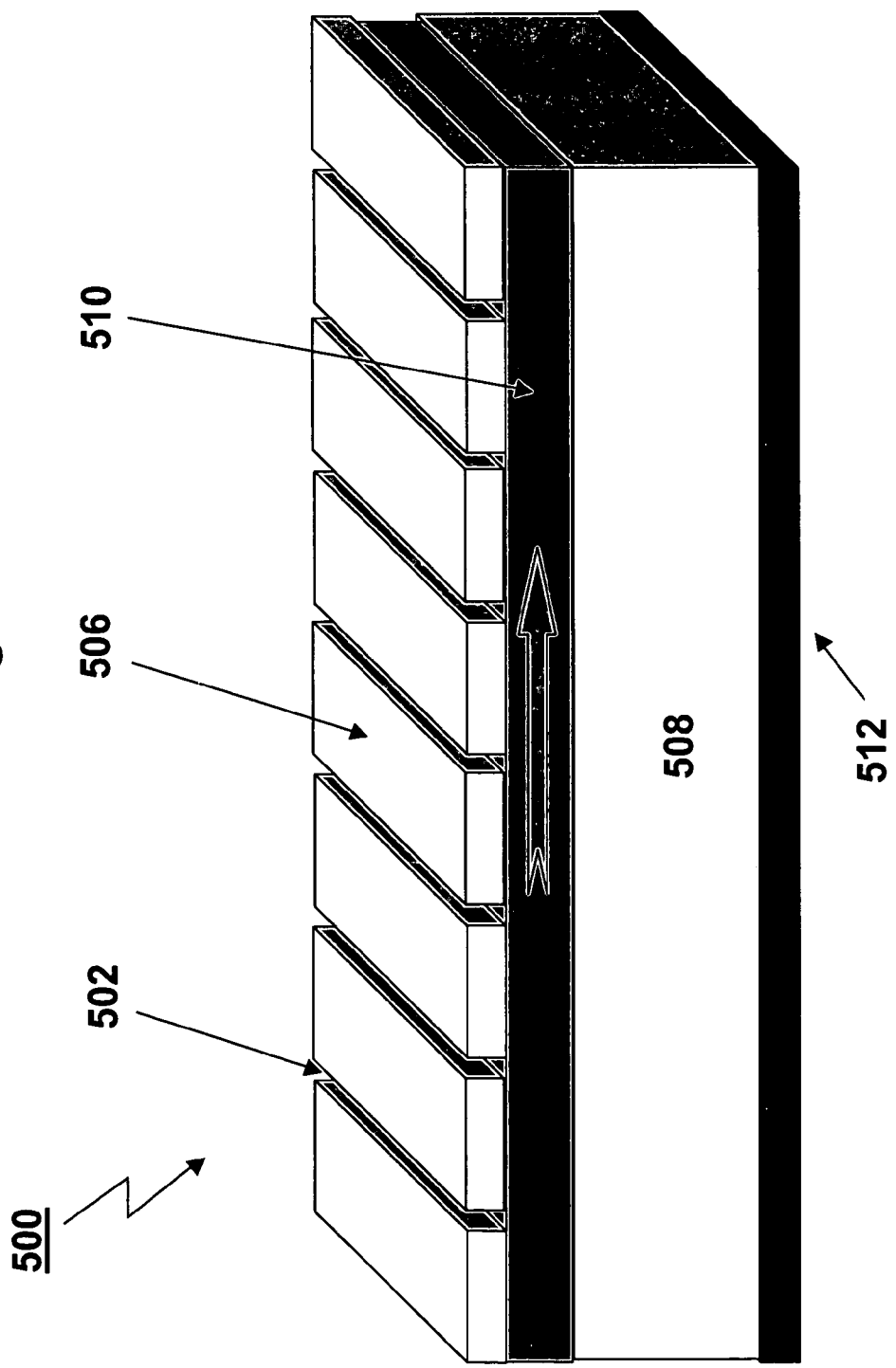
FIG. 5 shows a 1D planar cladding PC waveguide structure having air-filled slots.

FIG. 5 shows a first embodiment of the invention. Here, a planar waveguide structure 500 includes a substrate 512, a buffer layer 508, a core layer 510 and a cladding layer 506. The core 510 of the waveguide structure is disposed between the cladding layer 506 and the buffer layer 508. An array of mutually parallel trenches 502 is formed in the cladding layer 506, the trenches 502 being aligned perpendicularly to the direction of propagation of an optical signal through the waveguide 500. The trenches (or slots) 502 are air-filled.

Figure 6:
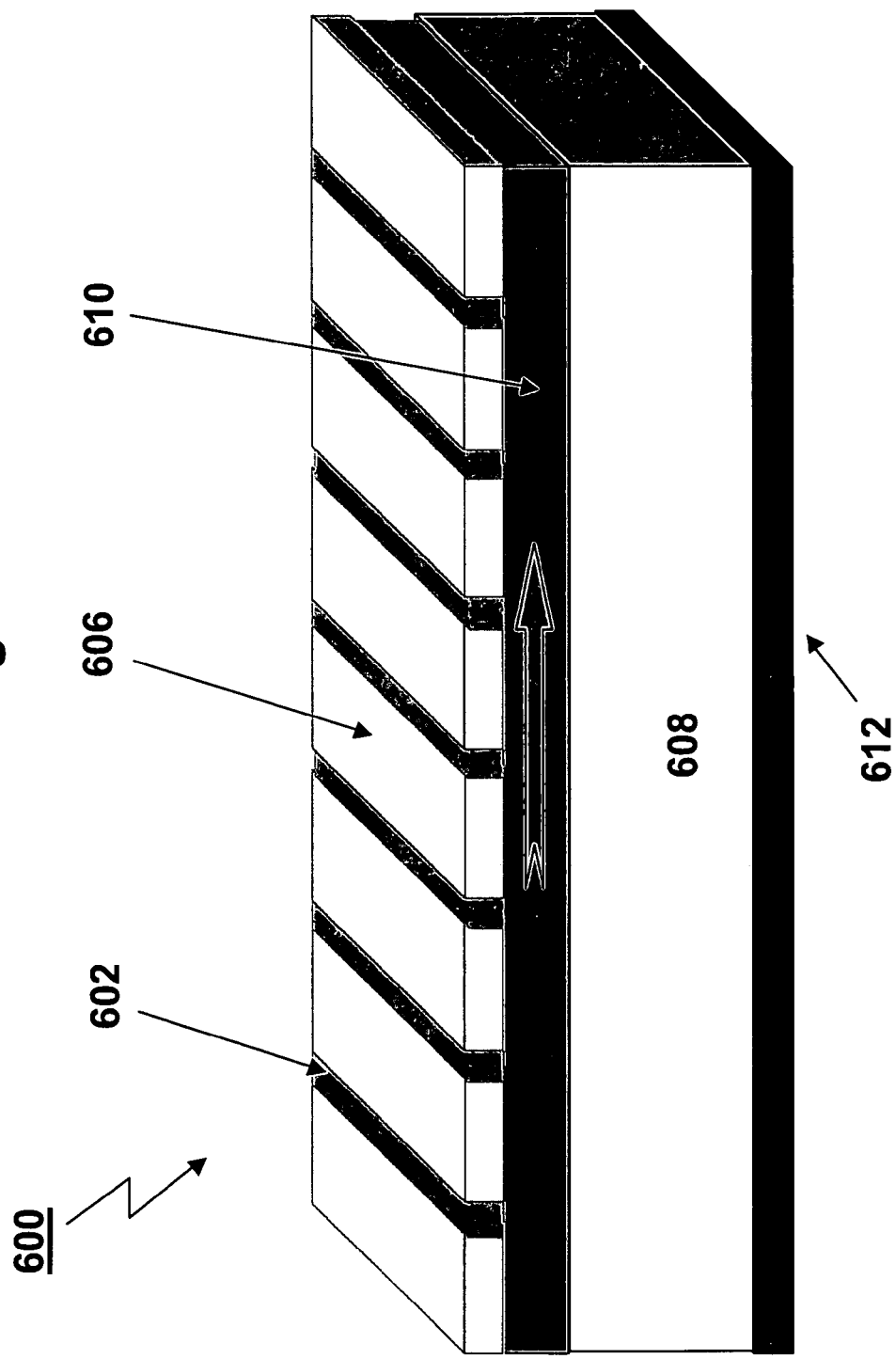
FIG. 6 shows a 1D planar cladding PC waveguide structure having slots filled with a filler material of higher dielectric constant than air.

FIG. 6 shows a second embodiment of the invention. Here, a planar waveguide structure 600 includes a substrate 612, a buffer layer 608, a core layer 610 and a cladding layer 606. The core 610 of the waveguide structure is disposed between the cladding layer 606 and the buffer layer 608. An array of mutually parallel trenches 602 is formed in the cladding layer 606, the trenches 602 being aligned perpendicularly to the direction of propagation of an optical signal through the waveguide 600. The trenches (or slots) 502 are formed of a filler material having a higher dielectric constant than air.

Figure 7:
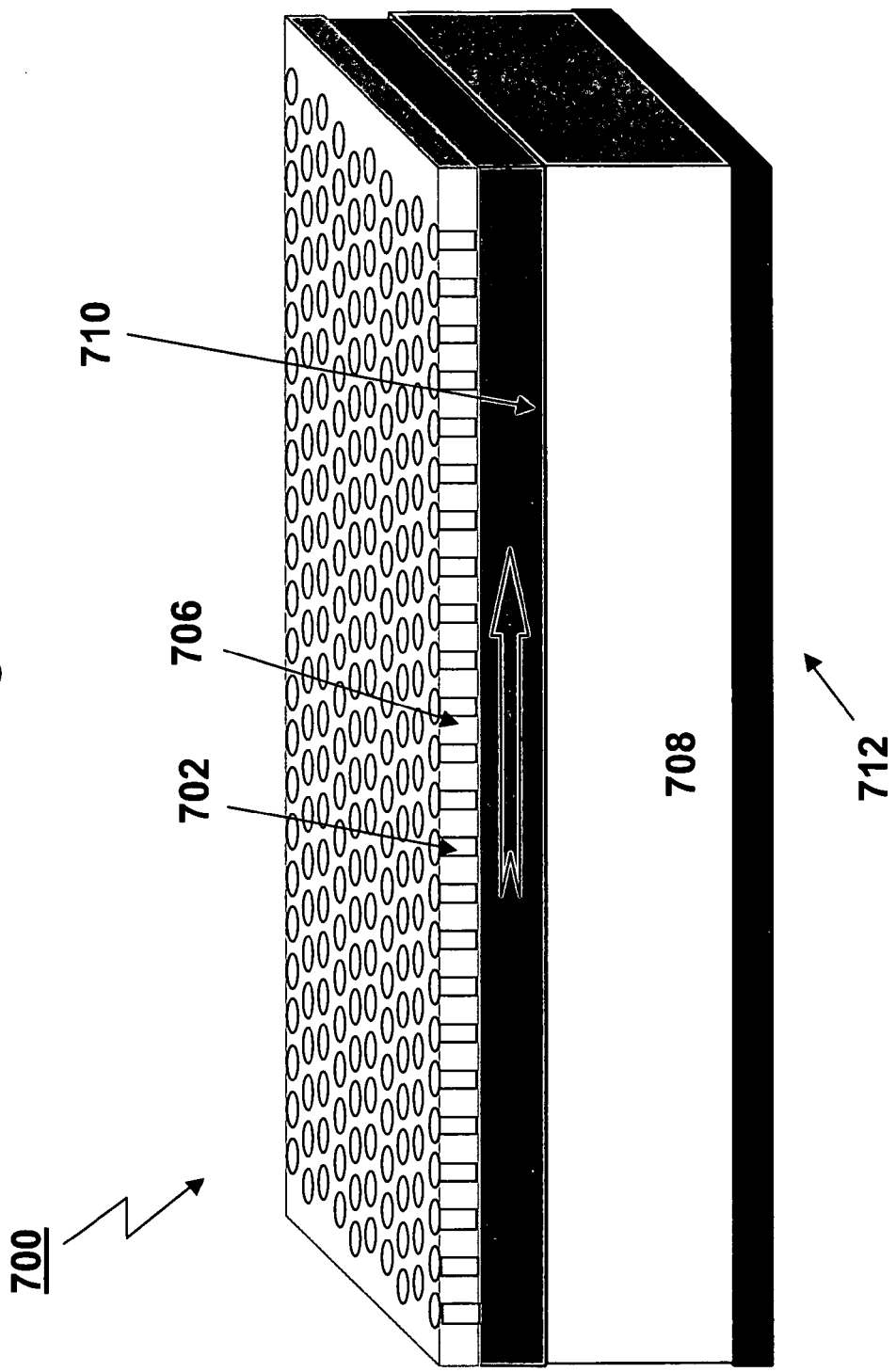
FIG. 7 shows a 2D planar cladding PC waveguide structure having air-filled rods.

FIG. 7 shows a third embodiment of the invention. Similarly to the first embodiment, FIG. 7 shows a planar waveguide structure 700 including a substrate 712, a buffer layer 708, a core layer 710 and a cladding layer 706. The core 710 of the waveguide structure is disposed between the cladding layer 706 and the buffer layer 708. An array of holes or rods 702 is formed in the cladding layer 706. The holes or rods 702 are air-filled.

Figure 8:
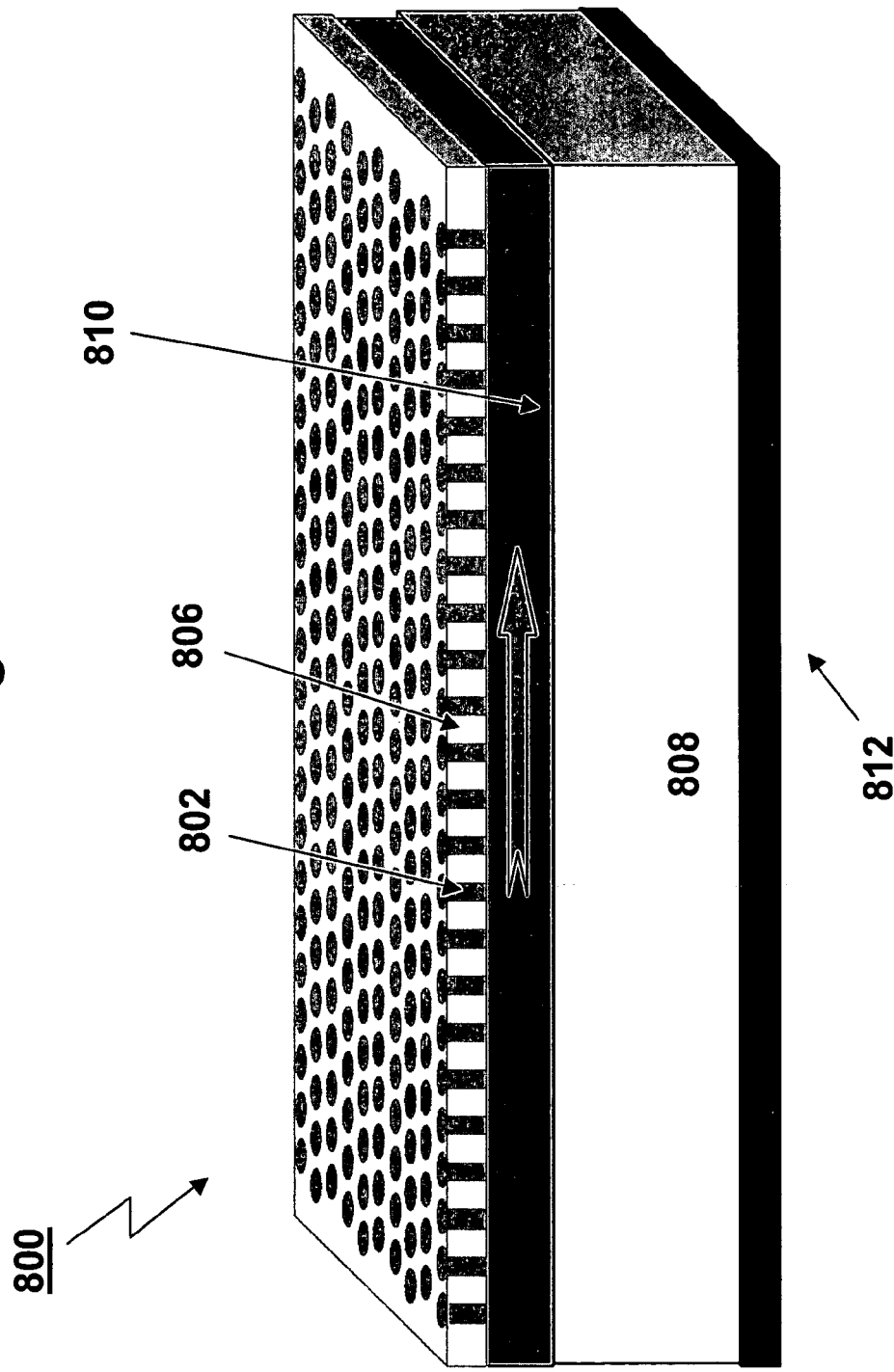
FIG. 8 shows a 2D planar cladding PC waveguide structure having rods filled with a filler material of higher dielectric constant than air.

FIG. 8 shows a fourth embodiment of the invention. Similarly to the first embodiment, FIG. 8 shows a planar waveguide structure 800 including a substrate 812, a buffer layer 808, a core layer 810 and a cladding layer 806. The core 810 of the waveguide structure is disposed between the cladding layer 806 and the buffer layer 808. An array of holes or rods 802 is formed in the cladding layer 806. The holes or rods 802 formed of a filler material having a higher dielectric constant than air.

Figure 9:
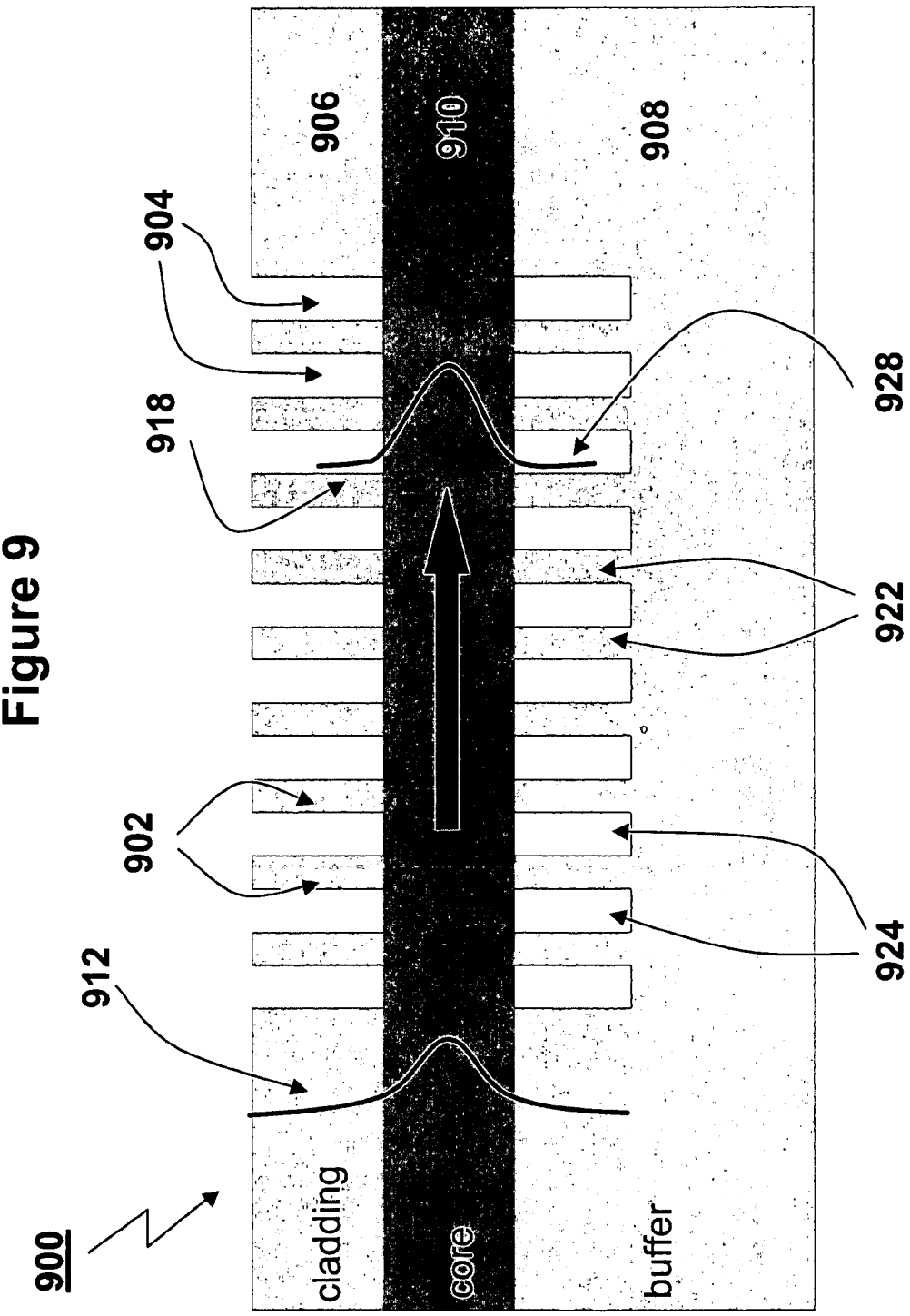
FIG. 9 shows a cross-sectional view of a cladding and buffer PC in a waveguiding structure in accordance with a further aspect of the present invention.

FIG. 9 shows a cross-sectional view of another example of a waveguiding structure in accordance with the present invention. Here, the waveguide structure 900 comprises a core layer 910, a cladding layer 906 and a buffer layer 908. Sub-regions 904 are formed in the cladding layer 906 but not in the core layer 910. Furthermore, sub-regions 924 are formed in the buffer layer 906: yet again the sub-regions do not extend into the core layer 910. The field profile 912 varies according to whether a core/cladding 902 or a core/sub-region 904 interface (and analogously a core/buffer 922 or a core/sub-region 924 interface) in the vertical direction is experienced. In the vicinity of a core/sub-region interface 904 (924) the evanescent field tail 918 (928) extends out a shorter distance into the sub-region medium and hence pushes the field further into the core while still maintaining strong confinement. The sub-regions may be air-filled or filled by another filler material, for example silicon.

Figure 10:
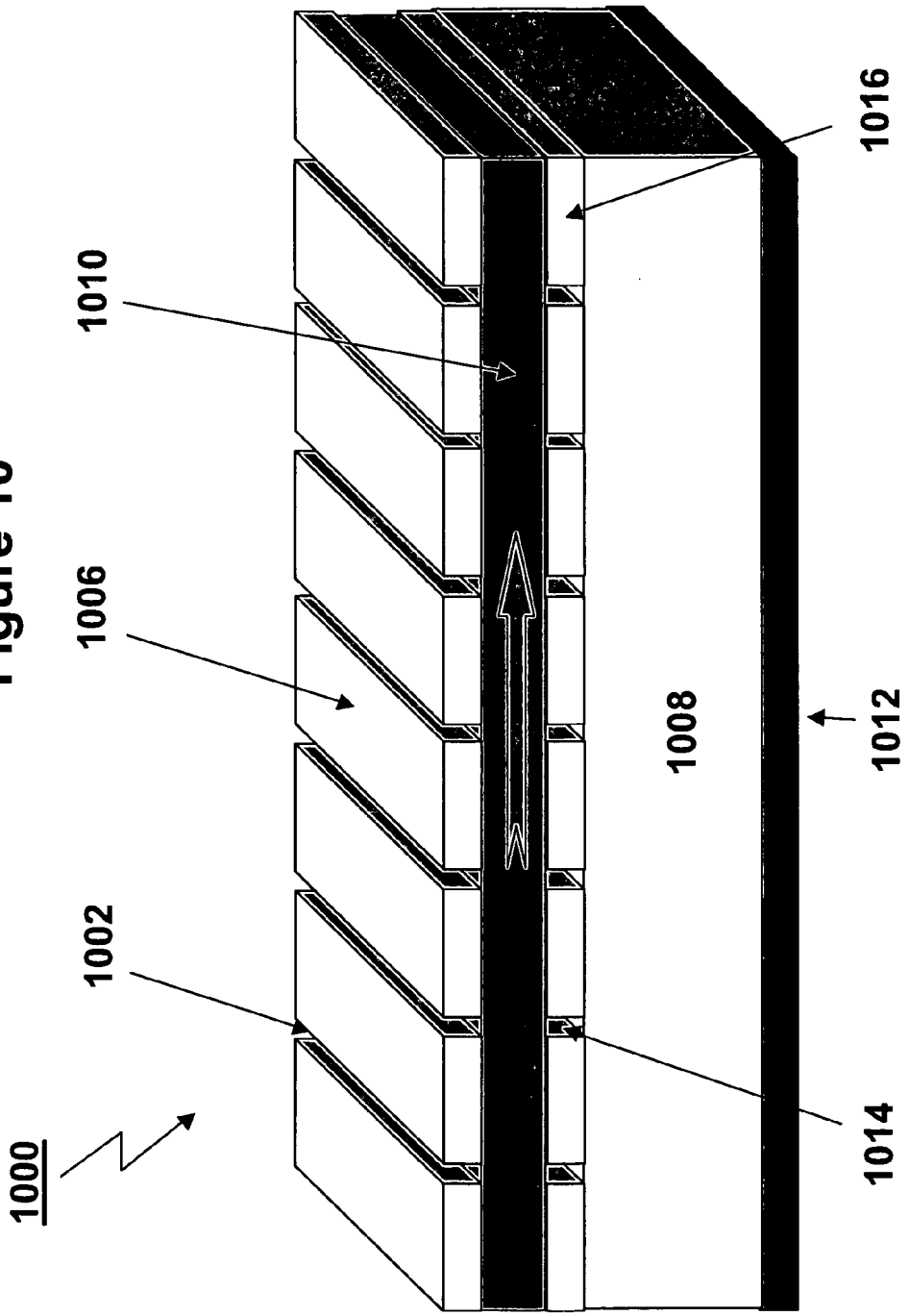
FIG. 10 shows a 1D planar cladding PC waveguide structure having air-filled slots formed in both cladding and buffer layers.

FIG. 10 shows a fifth embodiment of the invention. Similarly to the first embodiment, FIG. 10 shows a planar waveguide structure 1000 including a substrate 1012, a buffer layer 1008, a core layer 1010 and a cladding layer 1006. The core 1010 of the waveguide structure is disposed between the cladding layer 1006 and the buffer layer 1008. An array of mutually parallel trenches 1002 is formed in the cladding layer 1006, the trenches 1002 being aligned perpendicularly to the direction of propagation of an optical signal through the waveguide 1000. The trenches (or slots) 1002 are air-filled. In this embodiment, a further array of mutually parallel trenches 1014 is formed in an upper portion 1016 of the buffer layer 1008. Again the trenches 1014 are aligned perpendicularly to the direction of propagation of an optical signal and again the trenches (or slots) 1014 are air-filled.

Figure 11:
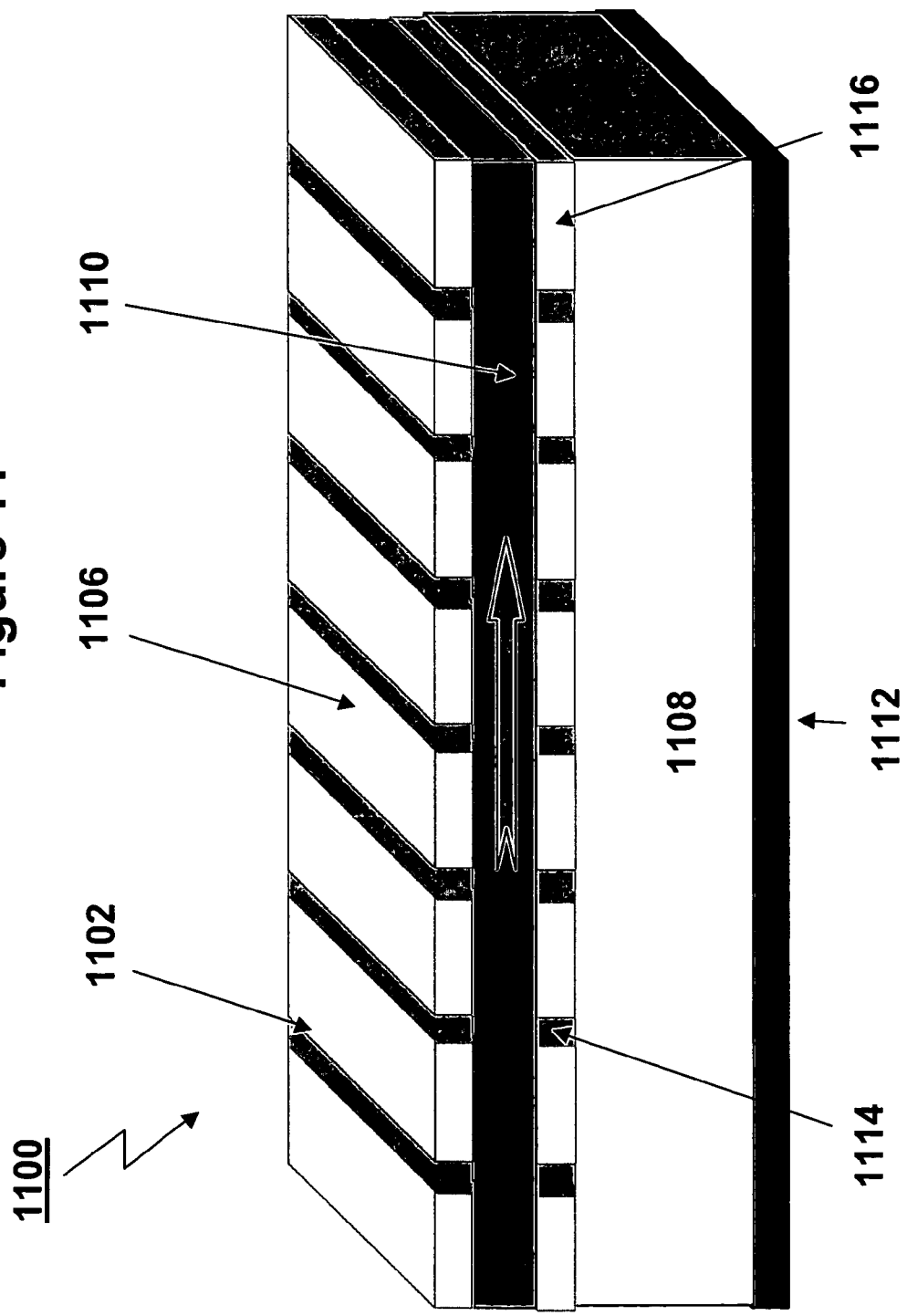
FIG. 11 shows a 1D planar cladding PC waveguide structure having slots filled with a filler material of higher dielectric constant than air, the slots being formed in both cladding and buffer layers.

FIG. 11 shows a sixth embodiment of the invention. Here, a planar waveguide structure 1100 includes a substrate 1112, a buffer layer 1108, a core layer 1110 and a cladding layer 1106. The core 1110 of the waveguide structure is disposed between the cladding layer 1106 and the buffer layer 1108. An array of mutually parallel trenches 1102 is formed In the cladding layer 1106, the trenches 1102 being aligned perpendicularly to the direction of propagation of an optical signal through the waveguide 1100. The trenches (or slots) 1102 are formed of a filler material having a higher dielectric constant than air. In this embodiment, a further array of mutually parallel trenches 1114 is formed in an upper portion 1116 of the buffer layer 1108. Again the trenches 1114 are aligned perpendicularly to the direction of propagation of an optical signal and again the trenches (or slots) 1114 are formed of a filler material having a higher dielectric constant than air.

Figure 12:
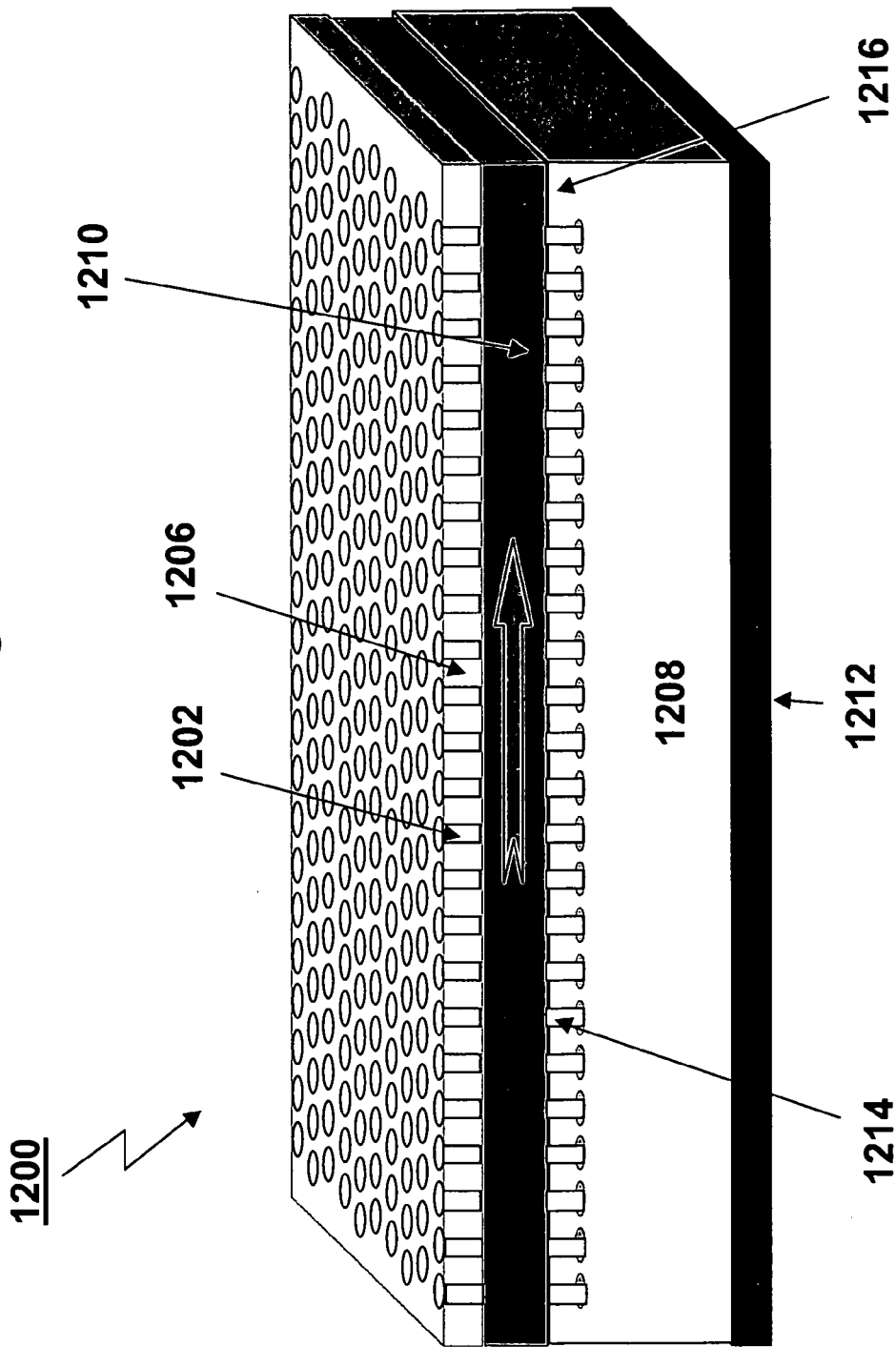
FIG. 12 shows a 2D planar cladding PC waveguide structure having air-filled rods formed in both cladding and buffer layers.

FIG. 12 shows a seventh embodiment of the invention. Similarly to the first embodiment, FIG. 12 shows a planar waveguide structure 1200 including a substrate 1212, a buffer layer 1208, a core layer 1210 and a cladding layer 1206. The core 1210 of the waveguide structure is disposed between the cladding layer 1206 and the buffer layer 1208. An array of holes or rods 1202 is formed in the cladding layer 1206. The holes or rods 1202 are air-filled. In this embodiment, a further array of holes or rods 1214 is formed in an upper portion 1216 of the buffer layer 1208. Again the holes or rods 1214 are air-filled.

Figure 13:
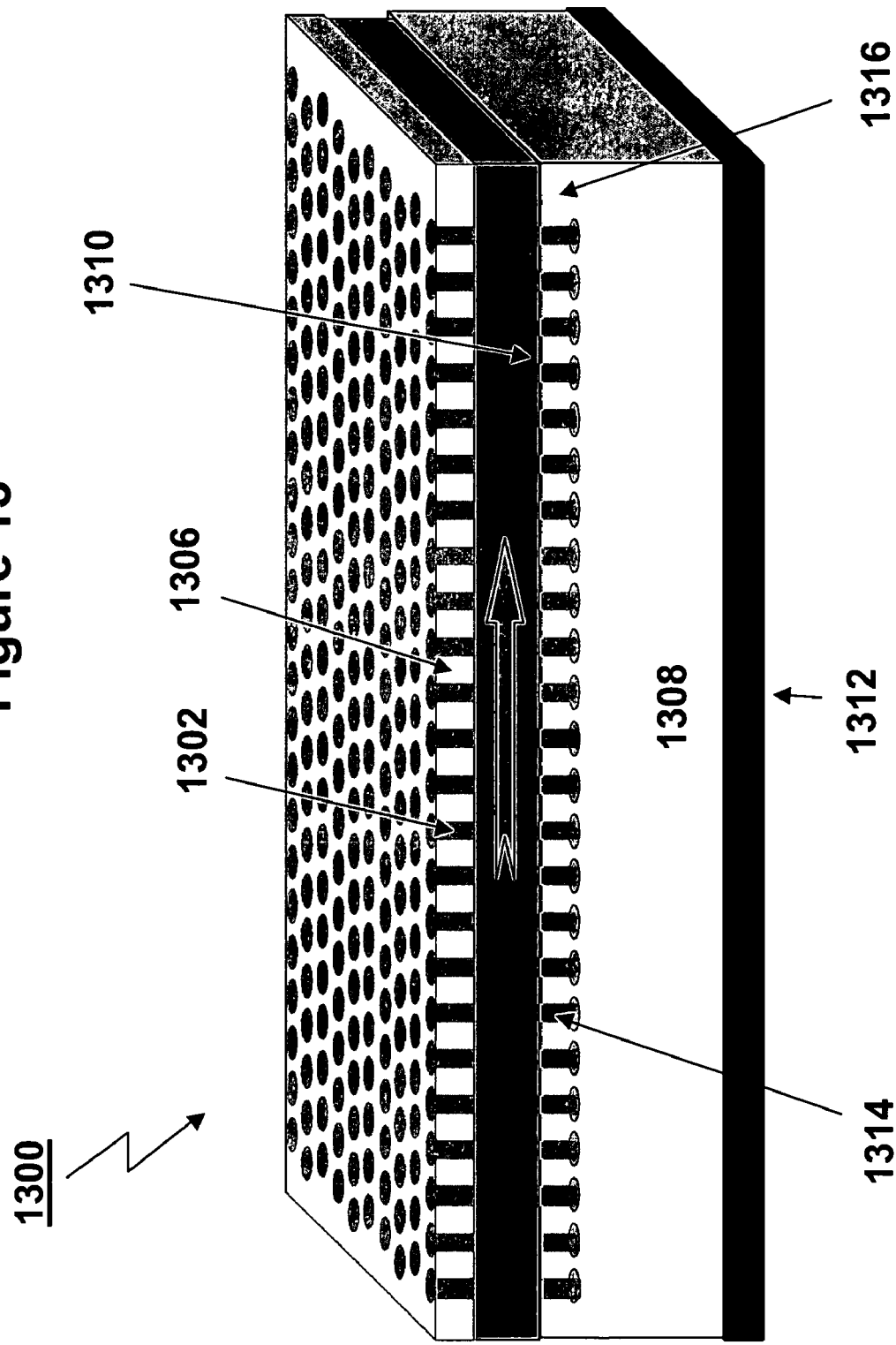
FIG. 13 shows a 2D planar cladding PC waveguide structure having rods filled with a filler material of higher dielectric constant than air, the rods being formed in both cladding and buffer layers.

FIG. 13 shows an eighth embodiment of the invention. Similarly to the first embodiment, FIG. 13 shows a planar waveguide structure 1300 including a substrate 1312, a buffer layer 1308, a core layer 1310 and a cladding layer 1306. The core 1310 of the waveguide structure is disposed between the cladding layer 1306 and the buffer layer 1308. An array of holes or rods 1302 is formed in the cladding layer 1306. The holes or rods 1302 formed of a filler material having a higher dielectric constant than air. In this embodiment, a further array of holes or rods 1314 is formed in an upper portion 1316 of the buffer layer 1308. Again the holes or rods 1314 are formed of a filler material having a higher dielectric constant than air.

Figure 14:
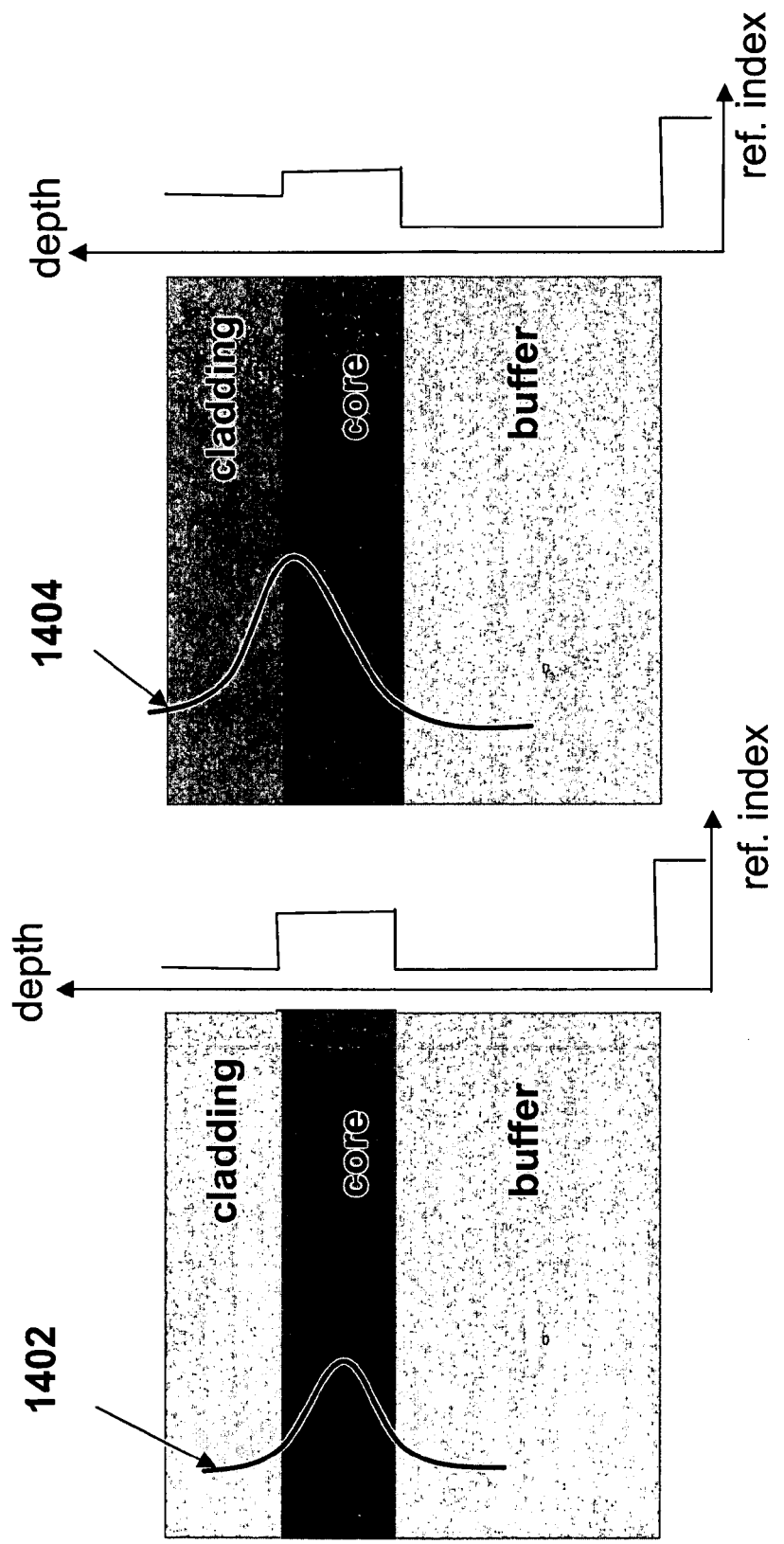
FIG. 14 shows a comparison between field profiles for a conventional symmetric waveguide and an asymmetrical waveguide.

Due to the weak perturbations of the cladding PC, it is desirable to alter the field profile of the waveguide so that more of the field is confined in the cladding while still maintaining its evanescent nature, as shown in FIG. 14. Shifting the field slightly up into the cladding also has the added advantage of reducing the losses into the substrate.

This can be done by increasing the refractive index of the cladding material relative to the buffer and core materials. In a preferred example, silicon oxynitride (SiON, with a refractive index $n_{cladding}$–1.55) is used as cladding material, while the buffer is made of silicon dioxide and the core of silicon nitride.

Due to the reduced leakage into the substrate, the buffer layer can be designed to be thinner while still maintaining the lossless nature of the waveguides in the telecommunication wavelength region. Just how thin will depend on numerous factors, for example the wavelength of operation, and the thickness and refractive index of the various layers. These factors correspond to parameters of the simulation of multilayer planar waveguides referred to earlier. Using the simulation, waveguide structures having reduced buffer thickness but substantially lossless propagation can be produced.

A guided mode is defined as a mode that can be set up in the multilayered structure of the waveguide. The condition for a guided mode at telecommunication wavelengths is $$n_{core} > n_{cladding} \geq n_{buffer}$$

where $n_{core}$=refractive index of core
$n_{cladding}$=refractive index of cladding
$n_{buffer}$=refractive index of buffer.

The condition for a lossless mode is different and can only be quantified when a guided mode is present in the waveguide, as the thickness of the layers has to be taken into account especially that of the buffer. If the buffer is thick, then the mode in the waveguide does not penetrate down into the substrate and leak into it. Additionally, if the core is thin, then the mode is expanded out further into the buffer, and hence the mode becomes more lossy.

An important feature to note is that the field profile in the cladding region must remain an evanescent field. The field component in the cladding should not possess a propagation constant in the vertical direction (perpendicular to the plane of the waveguide core). In this way the device maintains its in-plane nature.

FIG. 14 shows a comparison of the field profiles for a conventional 'symmetric' waveguide (where the cladding and buffer layers are made of identical materials, for example silicon dioxide) and an 'asymmetric' waveguide (where the cladding has a higher refractive index than the buffer). As may be surmised from the field profiles an increased percentage of the field power is now present in the cladding.

As compared with symmetrical arrangements, using an asymmetric arrangement allows air rods/slots etched into the cladding to provide larger bandgaps with stronger extinction ratios due to a larger percentage of the (evanescent) field being perturbed giving rise to a larger effective mode index contrast between the vicinity of the rods and that of the absence of the rods. These devices still provide bandgap effects while maintaining minimal out-of-plane diffraction losses.

One drawback of CPC devices is the contrast between the effective mode index in the waveguide and the effective mode index below the sub-regions, which is small when compared to conventional PC devices. However, if the etched air rods are filled with a high index material (for example, silicon) then the refractive index of the cladding layer ($n_{cladding}$) can be arranged to be significantly less than that of the sub-region ($n_{sub}$, for silicon $n_{sub}>3$); the contrast in refractive index, and therefore the dielectric contrast, between cladding layer and sub-region is pushed back up to very high values. Structures with a high index in-fill material will behave in a similar way to conventional PCs with strong extinction ratio bandgaps and large gap-midgap ratios. These structures behave like 2D high index rod PCs in a low-index background material.

Figure 15A:
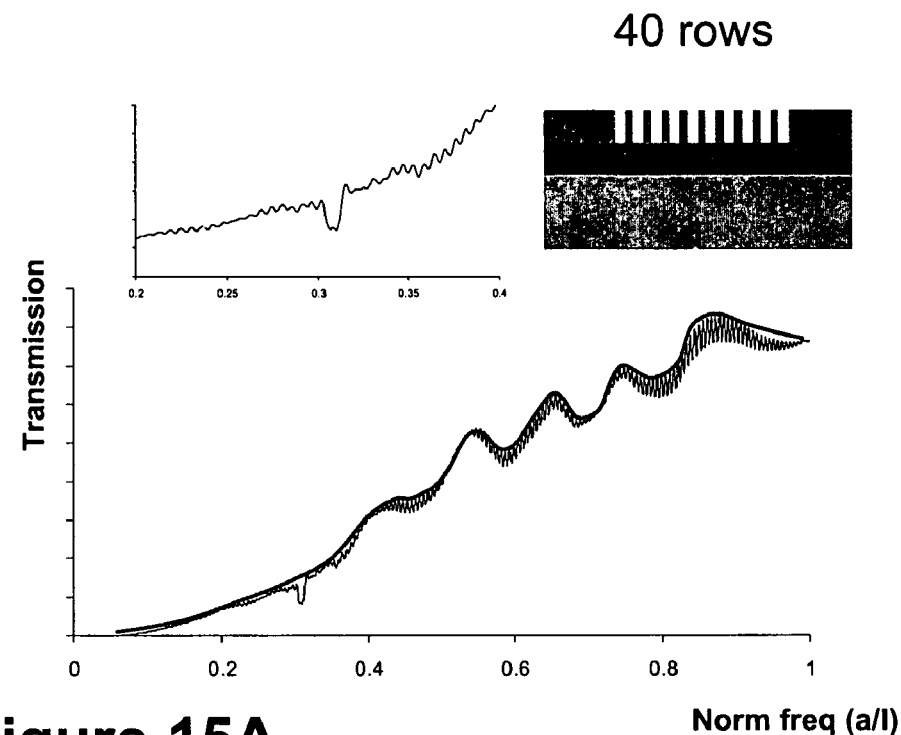
FIG. 15A shows TE mode simulations on a cladding PC structure with 40 air-filled rows.
Figure 15B:
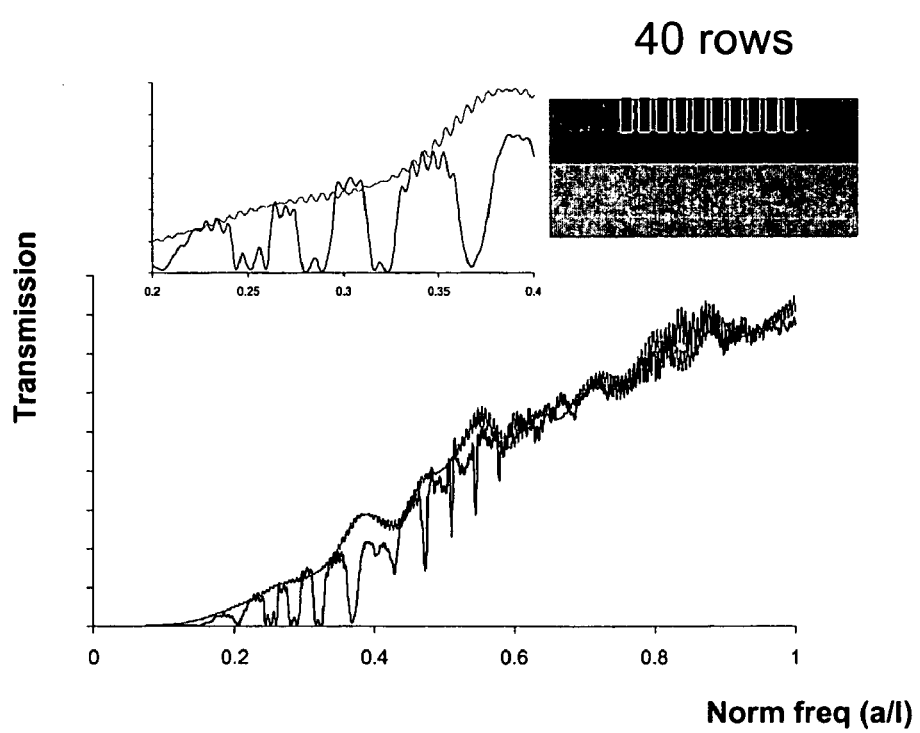
FIG. 15B shows TE mode simulations on a cladding PC structure with 40 silicon-filled rows.

For comparison with TE mode simulations in FIGS. 4A and 4B, FIGS. 15A and 15B show TE mode simulations on (symmetric) cladding PC structures with air rods and silicon in-filled rods respectively. The darker lines indicate the simulation performed for a waveguide with no PC at all. FIGS. 15A and 15B both simulate the behaviour for 40 rows etched into the cladding layer up to the core. As in FIGS. 4A and 4B, FIGS. 15A and 15B illustrate the transmission for such a structure. The loss in the device is maintained to a minimum (substantially identical to the losses in the air rod CPC).

Figure 16:
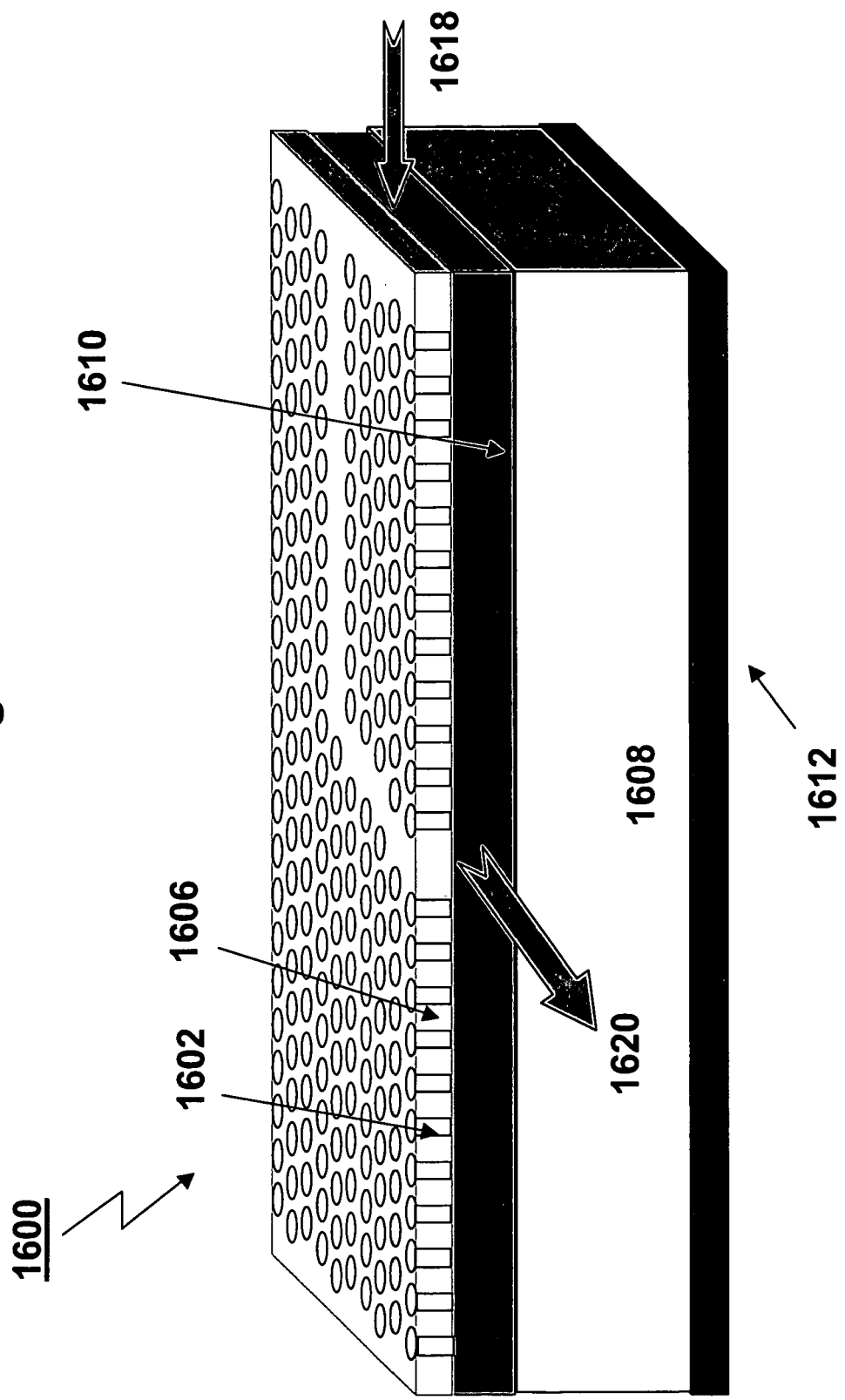
FIG. 16 shows a compact design for a 90 degree bend using Silicon-filled rods in a cladding PC.

The Si-rod CPC devices (such as the one simulated in FIG. 15B) also provide the ability of designing sharp 90 degree bends without etching straight through the core, and hence eliminate the need for deep etching and the complicated silicon filling of high aspect ratio air rods. FIG. 16 illustrates one compact arrangement for a 90 degrees bend using a silicon rod cladding PC. As the arrangement is based on high index rods arranged in a square lattice, the pitch and air-filling fraction can be large and hence the complicated in-filling of the air rods with a high index material can be further relaxed. Such a structure is realizable because the contrast between the Si rods and the effective index of the mode is large and provides a complete bandgap for all propagation directions, just as conventional PCs do.

Due to the high dielectric contrast, many more high order bandgaps appear which are not visible in the air rods CPC shown in FIG. 4B.

Figure 17:
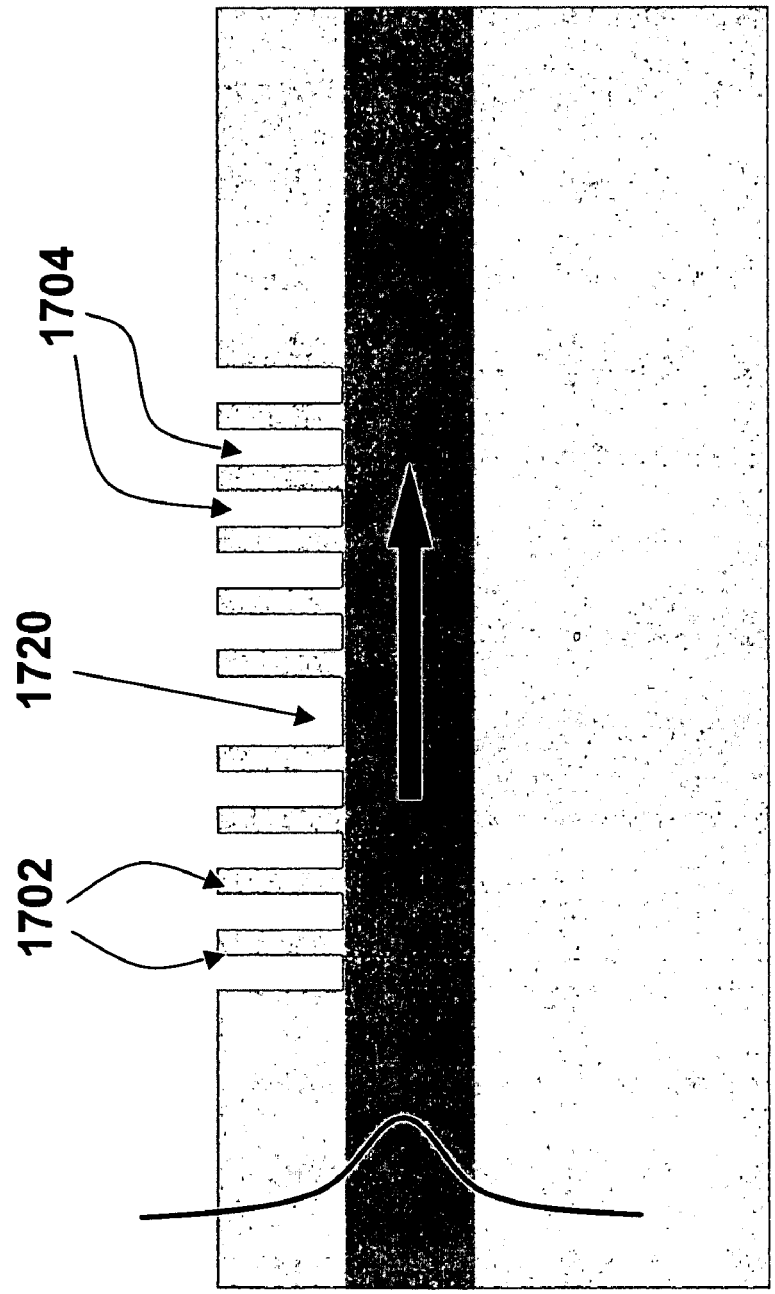
FIG. 17 shows a defect introduced by removing an air rod.
Figure 18:
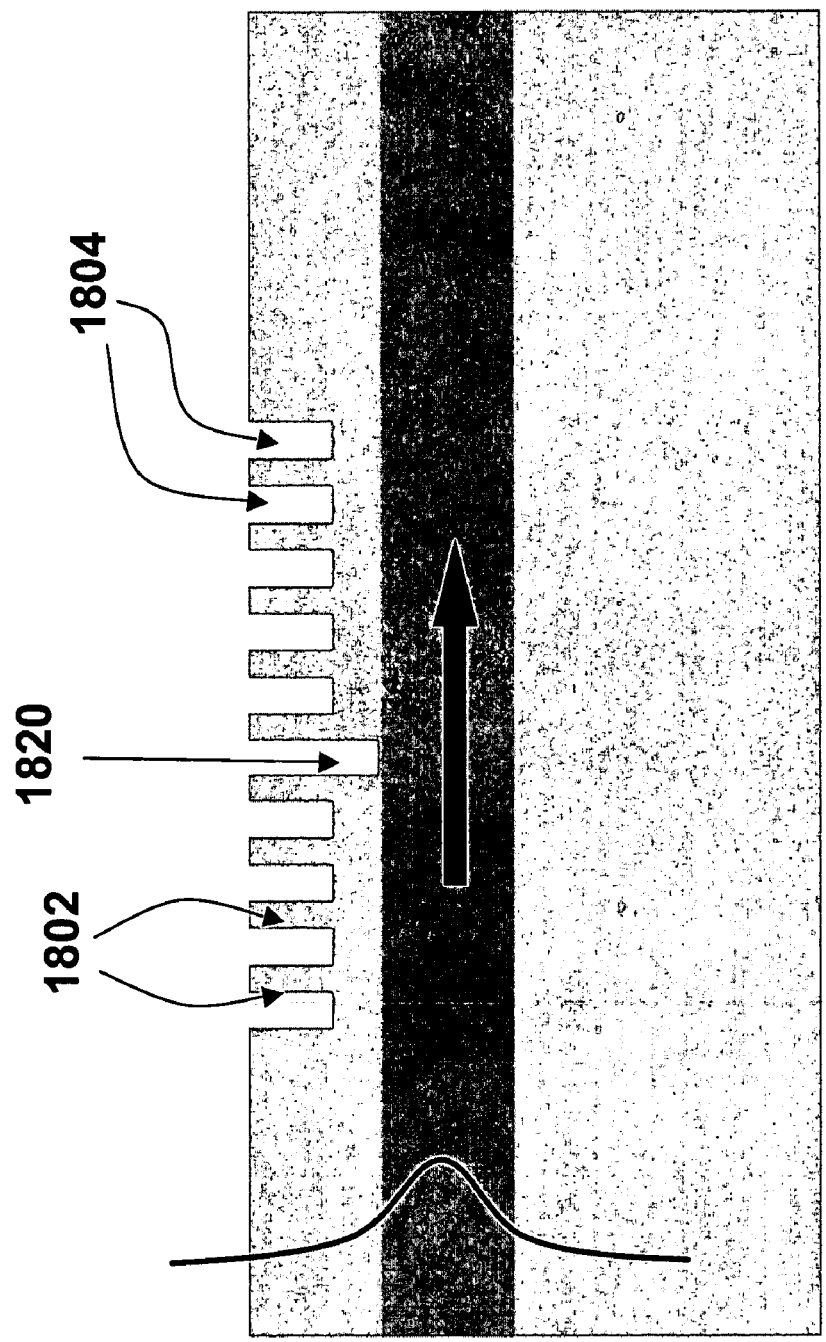
FIG. 18 shows a defect introduced by varying the etch depth of one of the rods.

The introduction of defects can lead to a variety of fruitful applications. As indicated in the discussion of prior art, there are many methods of introducing defects into PCs, most of which also apply to CPCs. A single air or silicon rod could be varied in size or totally removed (the latter shown in FIG. 17). The etch depth of one of the rods could also be varied, providing an alternative method of introducing defects (shown in FIG. 18). The air rods could be filled with active materials to introduce tunability: the active materials including liquid crystals and dyes.

The use of multiple rods could provide resonant coupling between several defect regions.

The superposition of regular lattices with different pitches, filling fractions or lattice geometries can also be used to introduce defects.

Figure 19:
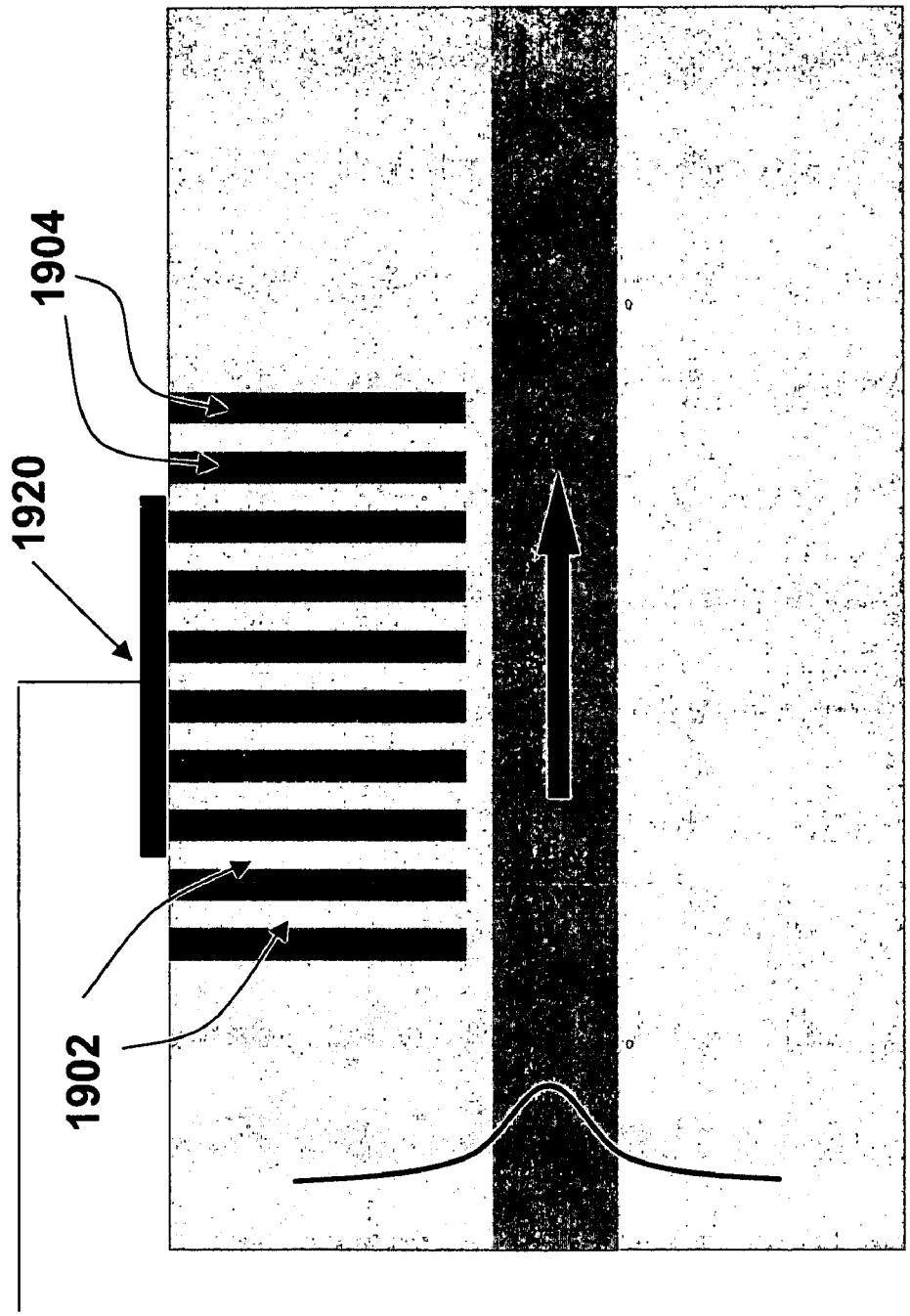
FIG. 19 shows how contact pads can be deposited on top of the structure to facilitate tuning of the dielectric constant.

If the cladding layer is thick enough, contact pads can be deposited on top of the structure (without the introduction of loss) to provide electrical contacts to vary the dielectric constant locally in a specific region and hence introduce tunability (FIG. 19). Alternatively the contacts themselves may be made very thin (of the order of ~2 nm).

Figure 20:
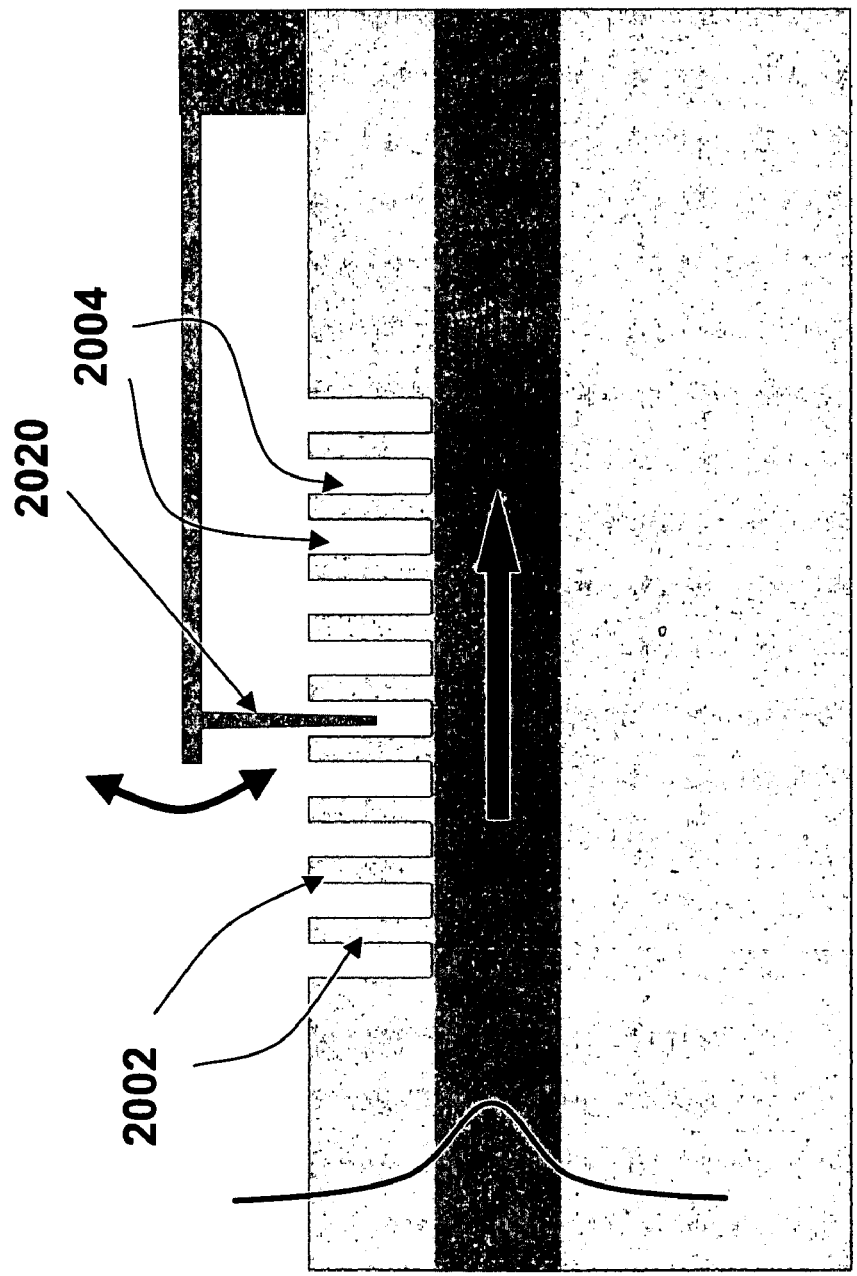
FIG. 20 shows an alternative scheme for tuning the defect state by introducing an AFM tip into one of the air rods.

It is also possible to tune the defect state by the introduction of a third medium into one of the air rods to vary the dielectric contrast locally. This could be performed by the use of an AFM tip (FIG. 20). Tuning of the defect state can also be achieved through the introduction of liquid crystals in the holes to provide tunability. Alternatively, dyes or polymers can be deposited in the holes. Active materials such as liquid crystals or dyes allow a cladding PC embedded in a laser to be designed to inhibit specific laser lines and to enhance other lines.

Defects can be introduced to enhance lasing at specific narrow line widths.

In embodiments where cladding and buffer sub-regions are both present, the sub-regions are not constrained to have symmetrical or correlated characteristics. The present invention is not limited to the permutations of cladding and buffer sub-regions illustrated in FIGS. 10 to 13. So for example the pitch of the cladding sub-regions is not necessarily substantially the same as the pitch of the buffer sub-regions: the cladding sub-regions are not required to be vertically aligned with the buffer sub-regions; nor are the filling fractions of the buffer and cladding regions always equal. Indeed, it is conceivable that either the cladding or buffer sub-regions may be formed as an array of holes or rods while the sub-regions of the other layer may be formed as an array of mutually parallel trenches. Alternatively or additionally, the cladding sub-regions may be formed of different materials from the buffer sub-regions.

FIGS. 11 and 13 each illustrate a scenario where the pitch of the cladding sub-regions is substantially the same as the pitch of the buffer sub-regions and where the cladding sub-regions are vertically aligned with the buffer sub-regions. Buffer and cladding sub-regions of different and/or offset pitches are also contemplated.

Figure 21:
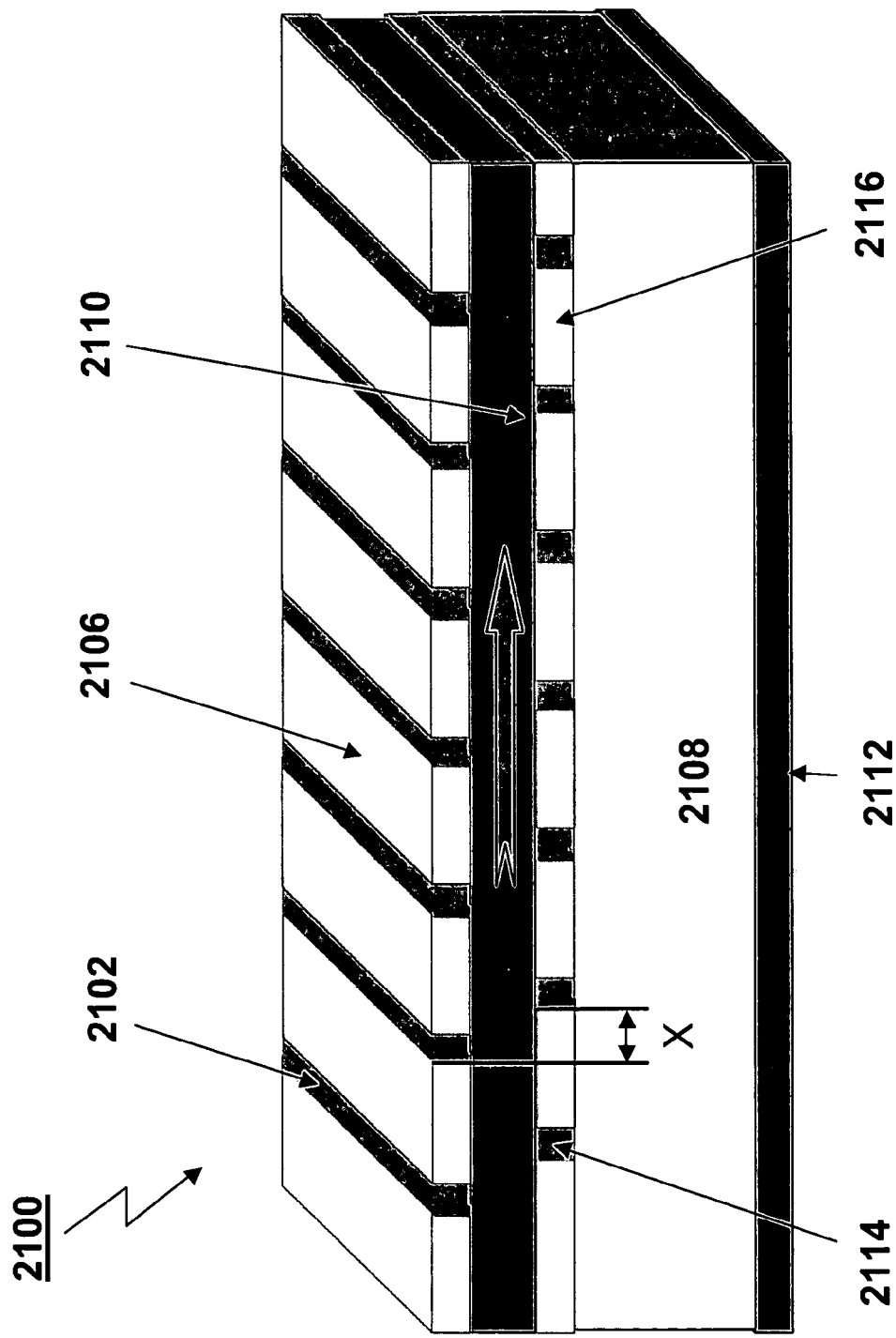
FIG. 21 shows a waveguide structure as illustrated in FIG. 11 where the trenches are offset with respect to one another.

FIG. 21 illustrates an embodiment where cladding sub-regions and buffer sub-regions both have substantially the same pitch. As in FIG. 11, FIG. 21 shows a planar waveguide structure 2100 that includes a substrate 2112, a buffer layer 2108, a core layer 2110 and a cladding layer 2106. The core 2110 of the waveguide structure is disposed between the cladding layer 2106 and the buffer layer 2108. An array of mutually parallel trenches 2102 is formed in the cladding layer 2106, the trenches 2102 being aligned perpendicularly to the direction of propagation of an optical signal through the waveguide 2100. The trenches (or slots) 2102 are formed of a filler material having a higher dielectric constant than air. In this embodiment, a further array of mutually parallel trenches 2114 is formed in an upper portion 2116 of the buffer layer 2108. Again the trenches 2114 are aligned perpendicularly to the direction of propagation of an optical signal and again the trenches (or slots) 2114 are formed of a filler material having a higher dielectric constant than air.

The sub-regions 2102,2114 are however offset with respect to one another, shifted by a distance, X, in the direction of the propagation of light through the waveguide.

Figure 22:
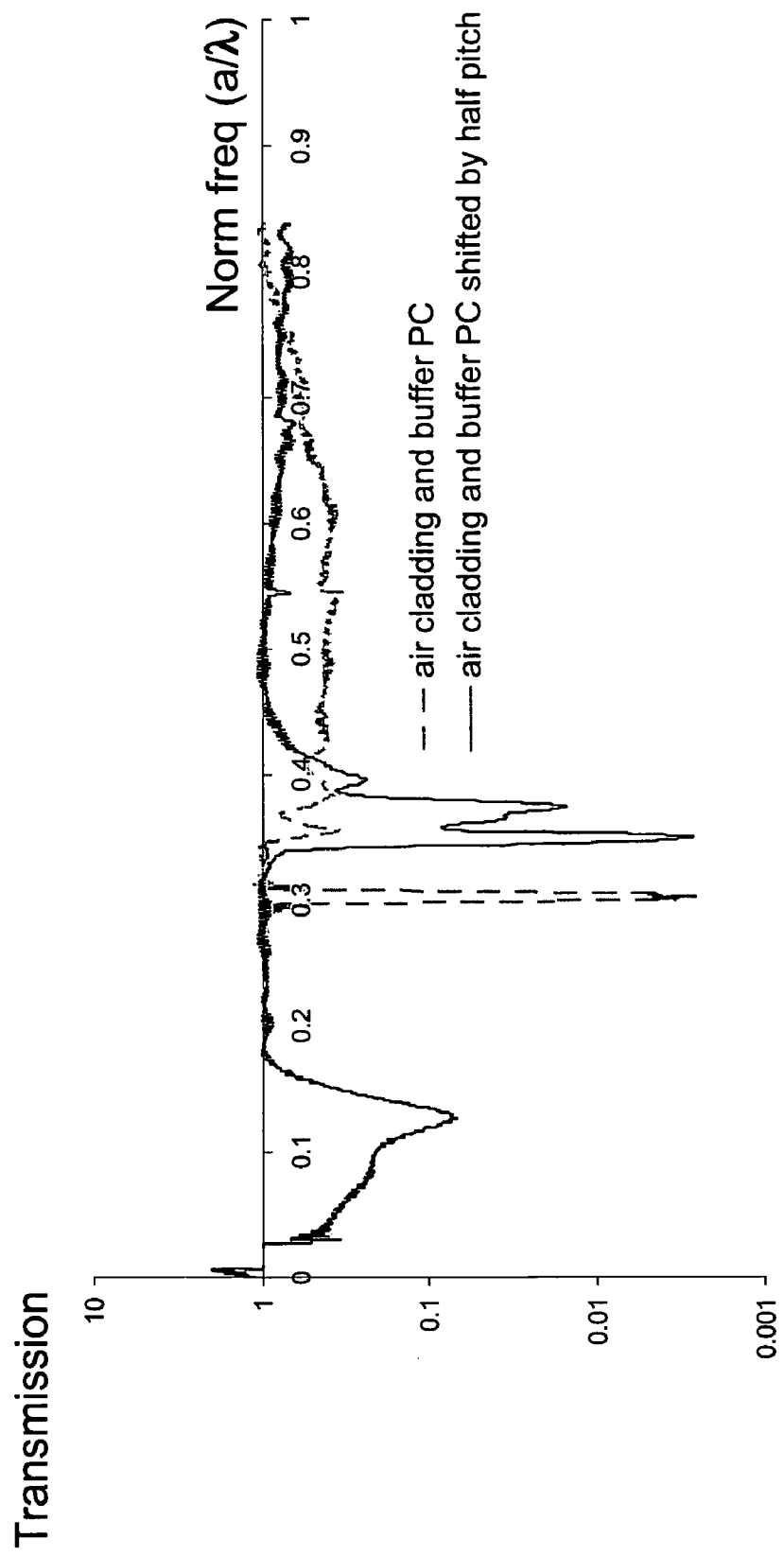
FIG. 22 shows a transmission spectrum graph for the waveguides illustrated in FIGS. 11 and 21.

FIG. 22 shows a transmission spectrum graph for the waveguides illustrated in FIGS. 11 and 21. The graph plots transmission against normalised frequency.

Figure 23:
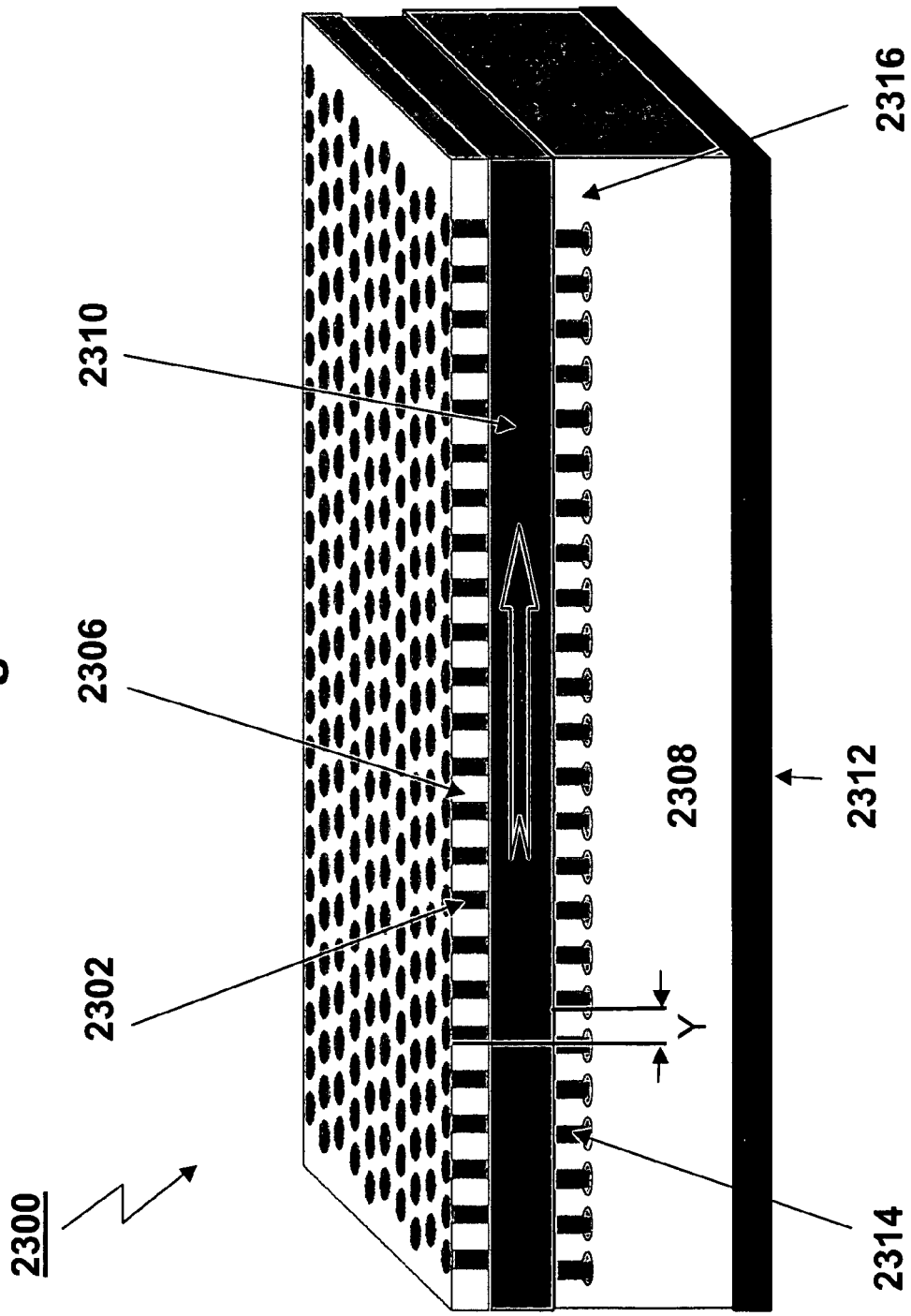
FIG. 23 shows a waveguide structure as illustrated in FIG. 13 where the rods are offset with respect to one another.

FIG. 23 illustrates a further embodiment where cladding sub-regions and buffer sub-regions both have substantially the same pitch, while the sub-regions are offset with respect to one another. On this occasion, both cladding sub-regions and buffer sub-regions are formed as holes or rods of a filler material. As in FIG. 13, FIG. 23 shows a planar waveguide structure 2300 that includes a substrate 2312, a buffer layer 2308, a core layer 2310 and a cladding layer 2306. The core 2310 of the waveguide structure is disposed between the cladding layer 2306 and the buffer layer 2308. An array of holes or rods 2302 is formed in the cladding layer 2306. The holes or rods 2302 formed of a filler material having a higher dielectric constant than air. In this embodiment, a further array of holes or rods 2314 is formed in an upper portion 2316 of the buffer layer 2308. Again the holes or rods 2314 are formed of a filler material having a higher dielectric constant than air.

Just as they are in FIG. 21, the sub-regions 2302,2314 in FIG. 23 are offset with respect to one another, shifted by a distance, Y, in the direction of the propagation of light through the waveguide.

Figure 24:
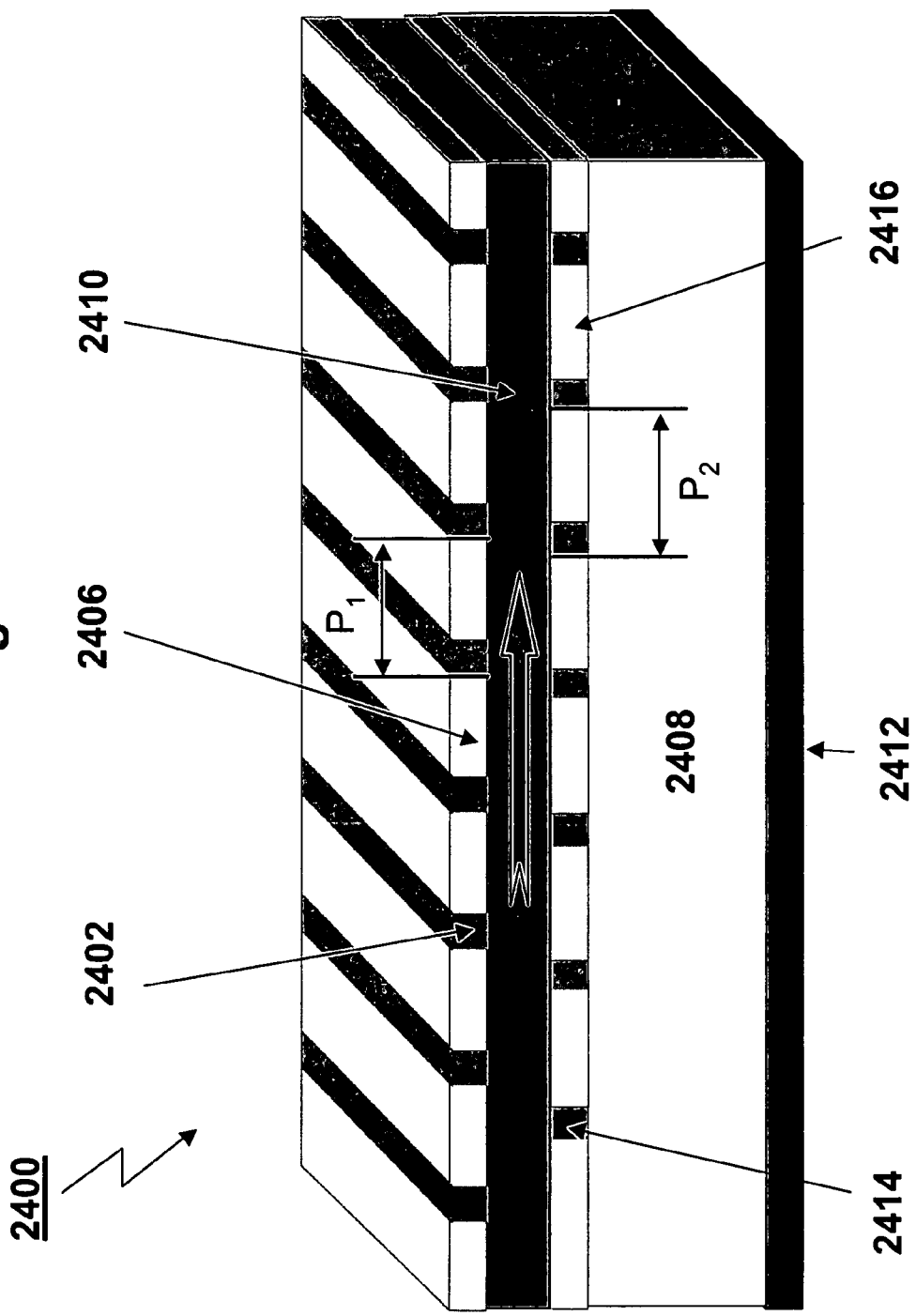
FIG. 24 shows a waveguide structure as illustrated in FIG. 11 where the cladding trenches and buffer trenches have differing pitches.

FIG. 24 illustrates an embodiment where cladding sub-regions and buffer sub-regions have differing pitches. Here, the planar waveguide structure 2400 includes a substrate 2412, a buffer layer 2408, a core layer 2410 and a cladding layer 2406. The core 2410 of the waveguide structure is disposed between the cladding layer 2406 and the buffer layer 2408. An array of mutually parallel trenches 2402 is formed in the cladding layer 2406 having a first pitch, $p_1$, (characteristic inter-trench separation), the trenches 2402 being aligned perpendicularly to the direction of propagation of an optical signal through the waveguide 2400. The trenches (or slots) 2402 are formed of a filler material having a higher dielectric constant than air. In this embodiment, a further array of mutually parallel trenches 2414 having a second pitch, $p_2$, is formed in an upper portion 2416 of the buffer layer 2408. Again the trenches 2414 are aligned perpendicularly to the direction of propagation of an optical signal, and again the trenches (or slots) 2414 are formed of a filler material having a higher dielectric constant than air.

Figure 25:
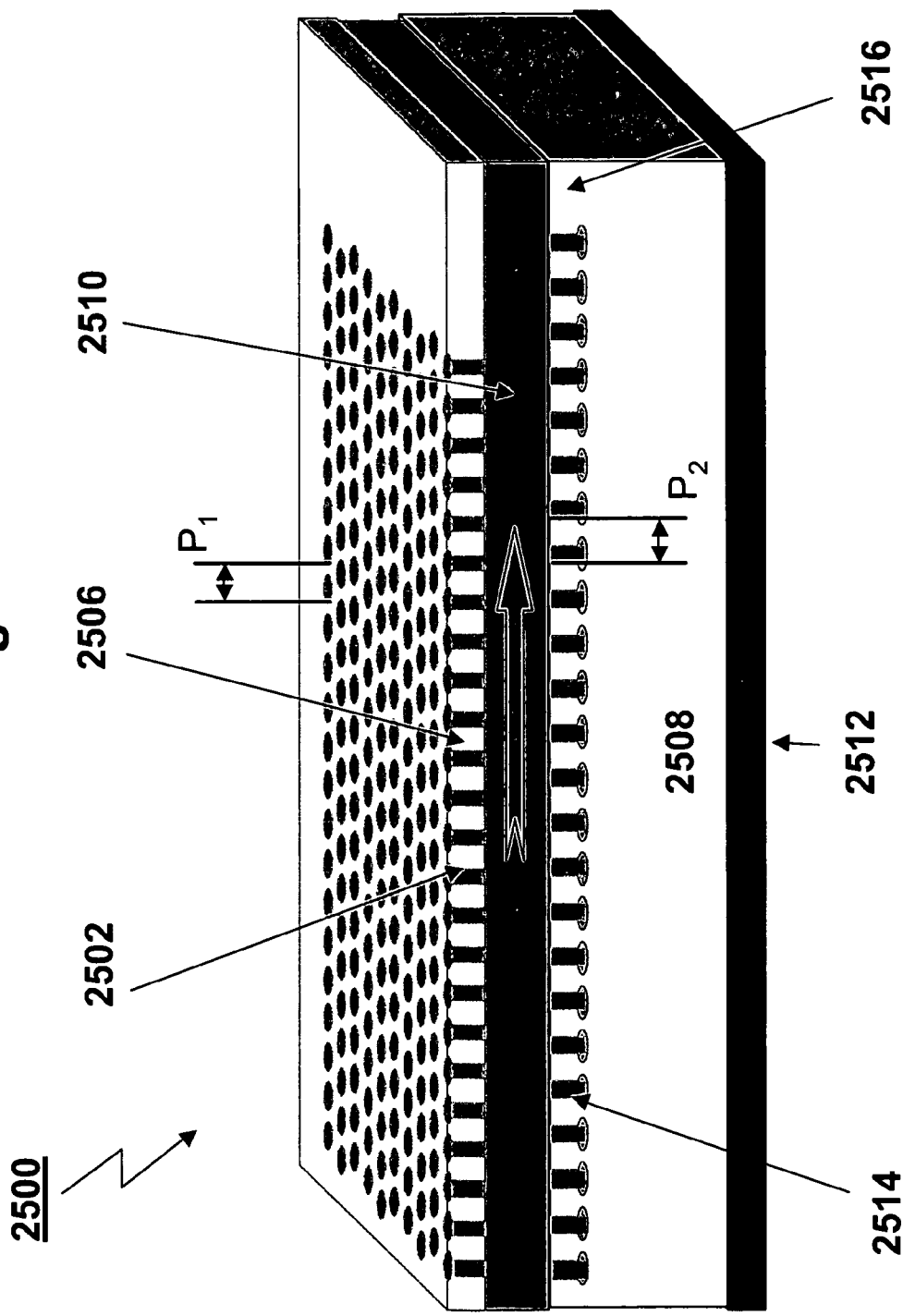
FIG. 25 shows a waveguide structure as illustrated in FIG. 13 where the cladding rods and buffer rods have differing pitches.

FIG. 25 also illustrates a further embodiment where cladding sub-regions and buffer sub-regions have differing pitches. In this embodiment, both cladding sub-regions and buffer sub-regions are formed as holes or rods of a filler material. As in FIG. 13, FIG. 25 shows a planar waveguide structure 2500 that includes a substrate 2512, a buffer layer 2508, a core layer 2510 and a cladding layer 2506. The core 2510 of the waveguide structure is disposed between the cladding layer 2506 and the buffer layer 2508. An array of holes or rods 2502 having a first pitch, $p_1$, is formed in the cladding layer 2506. The holes or rods 2502 formed of a filler material having a higher dielectric constant than air. A further array of holes or rods 2514 having a second pitch, $p_2$, is formed in an upper portion 2516 of the buffer layer 2508. Again the holes or rods 2514 are formed of a filler material having a higher dielectric constant than air.

As will readily be comprehended, differing pitches will permit the waveguide access to two filtering wavelengths, effectively combining two different PCs in one.

Figure 26:
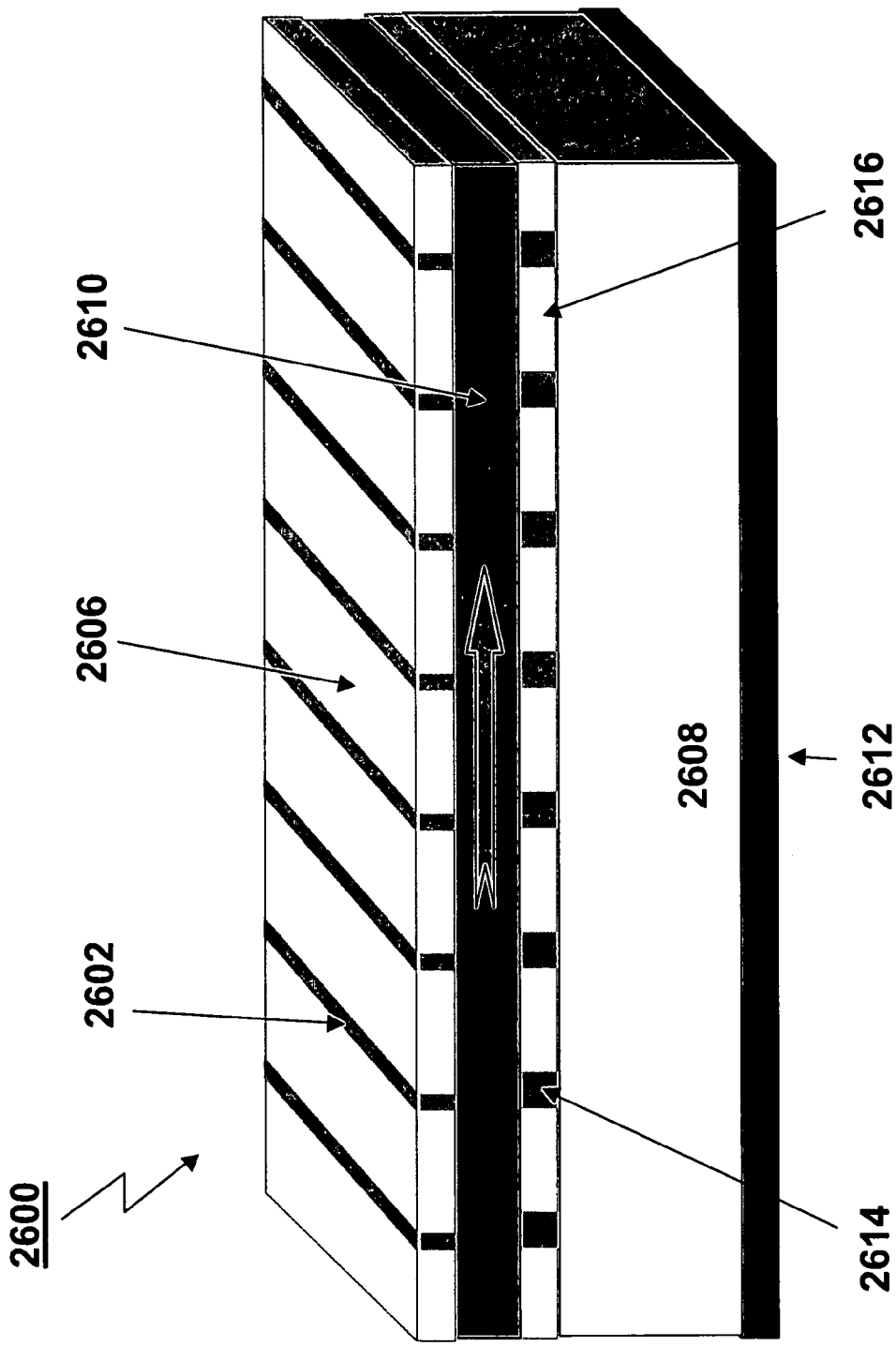
FIG. 26 shows a waveguide structure as illustrated in FIG. 11 where the buffer trenches have different filling fraction from the cladding trenches.
Figure 27:
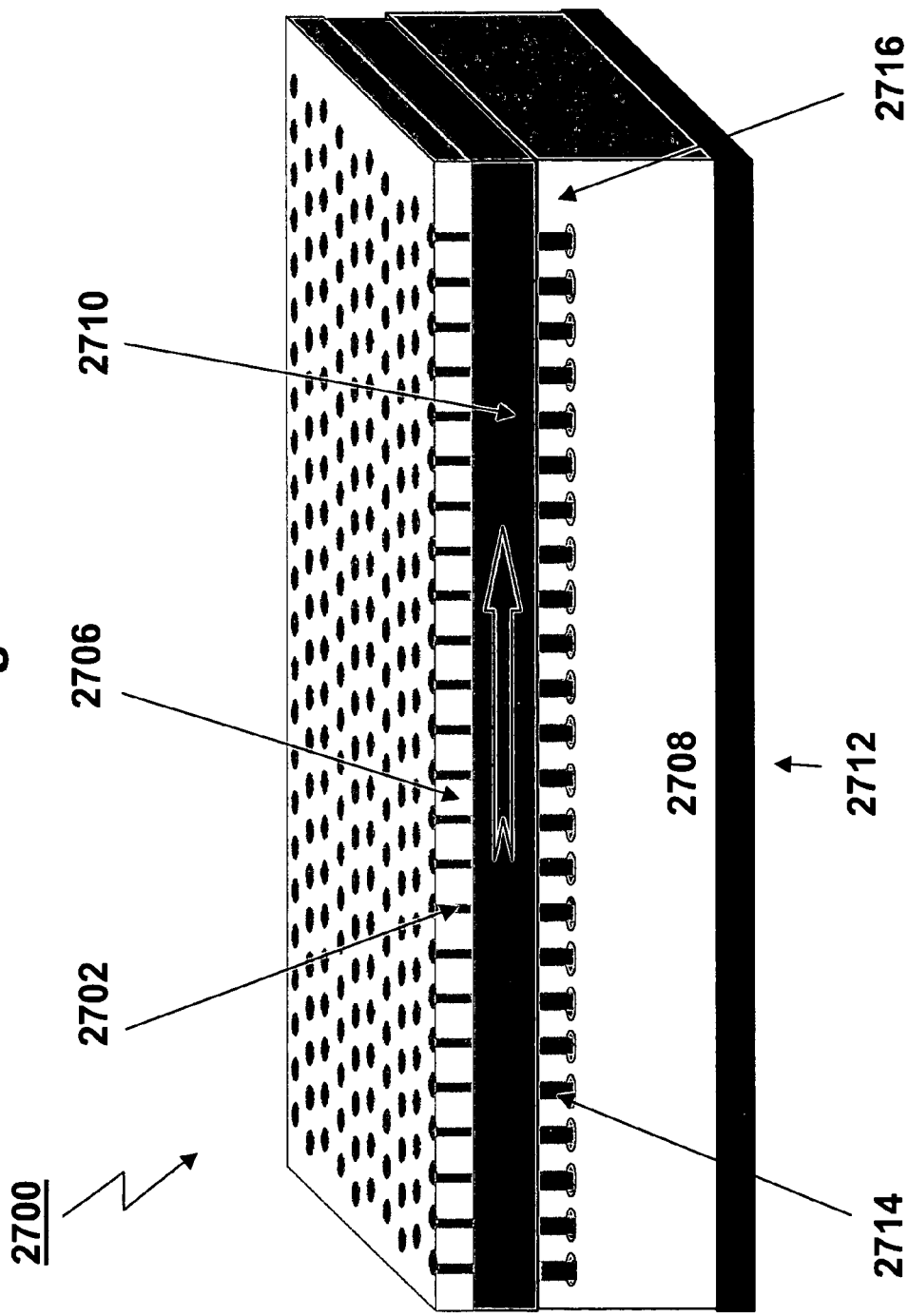
FIG. 27 shows a waveguide structure as illustrated in FIG. 13 where the buffer rods have different filling fraction from the cladding rods.

FIGS. 26 and 27 illustrate "cladding and buffer PC" waveguides with respectively sub-regions as mutually parallel trenches and sub-regions as arrays of rods where the filling fraction, corresponding to the ratio of sub-region volume to the volume of surrounding layer, is different.

FIG. 26 shows an embodiment where cladding sub-regions and buffer sub-regions have differing filling fractions. Here, the planar waveguide structure 2600 includes a substrate 2612, a buffer layer 2608, a core layer 2610 and a cladding layer 2606. The core 2610 of the waveguide structure is disposed between the cladding layer 2606 and the buffer layer 2608. An array of mutually parallel trenches 2602 is formed in the cladding layer 2606 having a first filling fraction, the trenches 2602 being aligned perpendicularly to the direction of propagation of an optical signal through the waveguide 2600. The trenches (or slots) 2602 are formed of a filler material having a higher dielectric constant than air. A further array of mutually parallel trenches 2614, having a second filling fraction, is formed in an upper portion 2616 of the buffer layer 2608. Again the trenches 2614 are aligned perpendicularly to the direction of propagation of an optical signal, and again the trenches (or slots) 2614 are formed of a filler material having a higher dielectric constant than air.

FIG. 27 also illustrates a further embodiment where cladding sub-regions and buffer sub-regions have differing filling fractions and where both cladding sub-regions and buffer sub-regions are formed as holes or rods of a filler material. As in FIG. 13, FIG. 27 shows a planar waveguide structure 2700 that includes a substrate 2712, a buffer layer 2708, a core layer 2710 and a cladding layer 2706. The core 2710 of the waveguide structure is disposed between the cladding layer 2706 and the buffer layer 2708. An array of holes or rods 2702 having a first filling fraction is formed in the cladding layer 2706. The holes or rods 2702 formed of a filler material having a higher dielectric constant than air. A further array of holes or rods 2714 having a second filling fraction is formed in an upper portion 2716 of the buffer layer 2708. Again the holes or rods 2714 are formed of a filler material having a higher dielectric constant than air.

Figure 28:
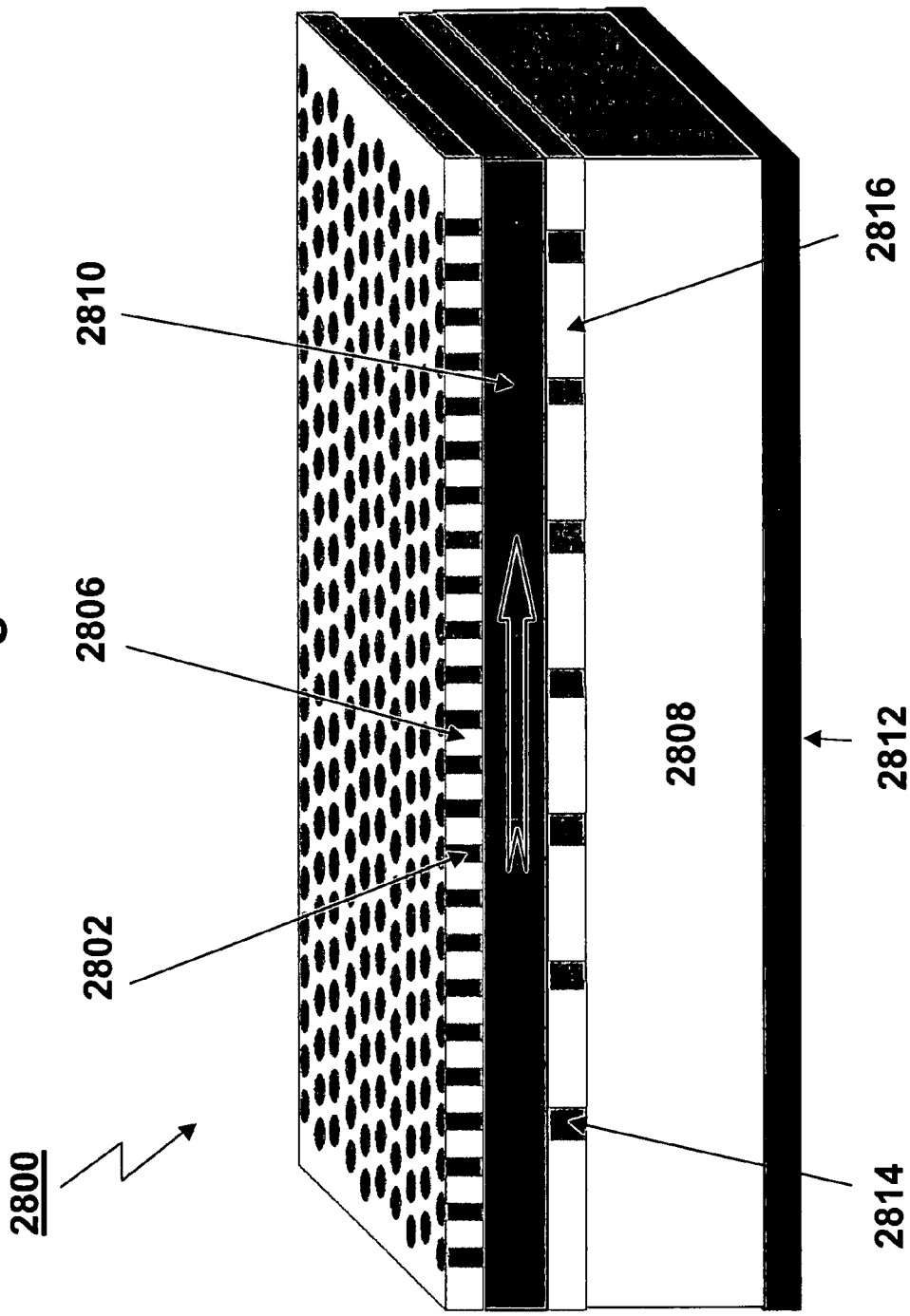
FIG. 28 shows a waveguide structure having a 2D cladding PC and a 1D buffer PC.

In yet another permutation of the present invention, the arrays in cladding and buffer layers may be of different types. FIG. 28 illustrates an embodiment where the cladding sub-regions are formed as an array of holes or rods while the buffer sub-regions are formed as an array of mutually parallel trenches.

The embodiment in FIG. 28 shows a planar waveguide structure 2800 including a substrate 2812, a buffer layer 2808, a core layer 2810 and a cladding layer 2806. The core 2810 of the waveguide structure is disposed between the cladding layer 2806 and the buffer layer 2808. An array of holes or rods 2802 having a first pitch, $p_1$, is formed in the cladding layer 2806. The holes or rods 2802 formed of a filler material having a higher dielectric constant than air. A further array of mutually parallel trenches 2814, having a second pitch, $p_2$, is formed in an upper portion 2816 of the buffer layer 2808. The trenches 2814 are aligned perpendicularly to the direction of propagation of an optical signal and formed of a filler material having a higher dielectric constant than air.

Aspects of the present invention may be further understood from the following illustrative examples:

As was explained above, it is possible to model the vertical confinement of light in multilayer planar waveguides. The relationship between frequency and wave-number for guided, vertically confined, modes is derived using the values of refractive index and thickness for each layer of the waveguide, and a value for the effective mode index, $n_{eff}$, can be deduced. The effective index variation ($\%_{eff}$) can then be calculated as the percentage variation between the effective mode index in the presence of sub-regions in the cladding and/or buffer layers (i.e. where a line dropping vertically through the multilayer waveguide encounters sub-regions in the cladding and/or buffer layers) and the effective mode index in the region of the waveguide, i.e. away from sub-regions.

Example 1 illustrates the percentage effective index variation that is found when air rods are provided in the cladding layer.

TABLE 1

| layer | material | refractive index | thickness (μm) |
|---|---|---|---|
| Cladding | Silicon dioxide | 1.46 | 1.0 |
| Core | Silicon nitride | 2.02 | 0.25 |
| Buffer | Silicon dioxide | 1.46 | 15.0 |
| Substrate | Silicon | 3.46 | N/A |

Taking typical values and materials, as set out in Table 1, for λ=1.55 μm and an etch depth of 900 nm, the effective index for TE0 mode is 1.65277 in the waveguide region and 1.62335 in the rod region, giving an effective index variation $\%_{eff}$ of 1.78%.

There is a range of possible permutations of thicknesses and materials that will provide the desired values of effective index variation. Altering etch depth alone is also contemplated. With an etch depth of 820 nm, the effective index variation changes to $\%_{eff}$=1.02%, and for 445 nm, becomes $\%_{eff}$=0.1%.

Selecting a cladding layer having a thickness of just 200 nm and an etch depth of 150 nm, the effective index for TE0 mode is 1.63802 in the waveguide region and 1.6109 in the rod region, giving an effective index variation $\%_{eff}$ of 1.68% for λ=1.55 μm.

The use of filled rods, for example silicon-filled rods, serves to increase the effective index variation.

Example 2 illustrates the percentage effective index variation that is found when filled rods are provided in a cladding layer made of silicon oxynitride while the buffer layer is made of silicon dioxide. This gives an asymmetric distribution of the power in the guided optical signal—represented as a percentage of the evanescent field of the TE0 mode (% TE0) in Table 2. Here again λ=1.55 μm.

TABLE 2

| layer | material | refractive index | thickness (μm) | % TE0 |
|---|---|---|---|---|
| Protective | Silicon dioxide | 1.46 | 0.6 | 0.39 |
| Cladding | Silicon oxynitride | 1.55 | 0.8 | 41.85 |
| Core | Silicon nitride | 2.02 | 0.25 | 28.98 |
| Buffer | Silicon dioxide | 1.46 | 15 | 1.68 |

For comparison, 52.43% of the evanescent field of the TM0 mode is confined to the cladding. The maximum cladding refractive index can be calculated by solving the following equations 1) and 2).

Equation 1)- for the TE0 mode $$\tan\left(2 * \frac{2\pi}{\lambda} * \frac{t_{core}}{2} * \sqrt{n_{core}^2 - n_{cladding}^2}\right) * (n_{core}^2 - n_{cladding}^2) - (n_{cladding}^2 - n_{buffer}^2) = 0$$

Equation 2)- for the TM0 mode $$\tan\left(2 * \frac{2\pi}{\lambda} * \frac{t_{core}}{2} * \sqrt{n_{core}^2 - n_{cladding}^2}\right) * (n_{core}^2 - n_{cladding}^2) * n_{buffer}^2 - (n_{cladding}^2 - n_{buffer}^2) * n_{core}^2 = 0$$

where:
λ=wavelength of operation
$t_{core}$=thickness of core
$n_{core}$=refractive index of core
$n_{cladding}$=refractive index of cladding
$n_{buffer}$=refractive index of buffer By using a root solving algorithm (for instance, the downhill method, Newton Raphson or a semi-analytical graphical zero search), the value for the maximum $n_{cladding}$ refractive index can be predicted. Any material having a refractive index up to that index will provide an asymmetrical mode that forms an evanescent field in the cladding layer. If the cladding layer refractive index is higher than that maximum value, the cladding will start to guide some of the light.

Equations 1) and 2) are derived for an ideal structure having only a cladding layer a core layer and a buffer layer. In such an ideal structure, the planar waveguide structure is essentially lossless and (provided the refractive index of the cladding remains below the maximum value) the core will confine a guided mode. Applying the equations to more realistic structures amounts to assuming that the substrate does not interfere greatly with the core by having a thick enough buffer layer. The introduction of a substrate necessarily incurs a loss component.

Guided modes in real structures are inevitably lossy to some extent because the evanescent field extends out to infinity, and a significant component of the mode can couple into the substrate. It is noted that a lossy mode can still propagate long distances, as it would if the loss were around 0.002 dB/cm.

In addition to the presence of a (high refractive index) substrate, further complexity is introduced by the provision of a low index protective material coating over the cladding layer. Even the thickness of the cladding layer can be a factor in determining the magnitude of the loss component. The evanescent field can couple to a protective layer and/or a cladding layer, just as it does to the substrate.

The equations for the ideal waveguide structure do not inform the user on the permissible thicknesses of the cladding layers. Introducing thickness to the cladding layer will vary the properties of higher order modes. If the cladding is too thick, undesirable higher order guided modes start appearing in the cladding, even if the cladding material index is below the maximum value of index permitted by the equations. Hence, care has to be taken in the choice of cladding and/or buffer thickness in order to minimise the undesirable higher order modes.

As may be realised from the preceding description, the present invention is not restricted to the provision of a single core layer. The model of a multilayer planar waveguides can easily account for a permutation of layers where two thin layers of wave guiding core are present while the condition for a lossless mode profile $n_{core} > n_{cladding} \geq n_{buffer}$ is still met.

Figure 29:
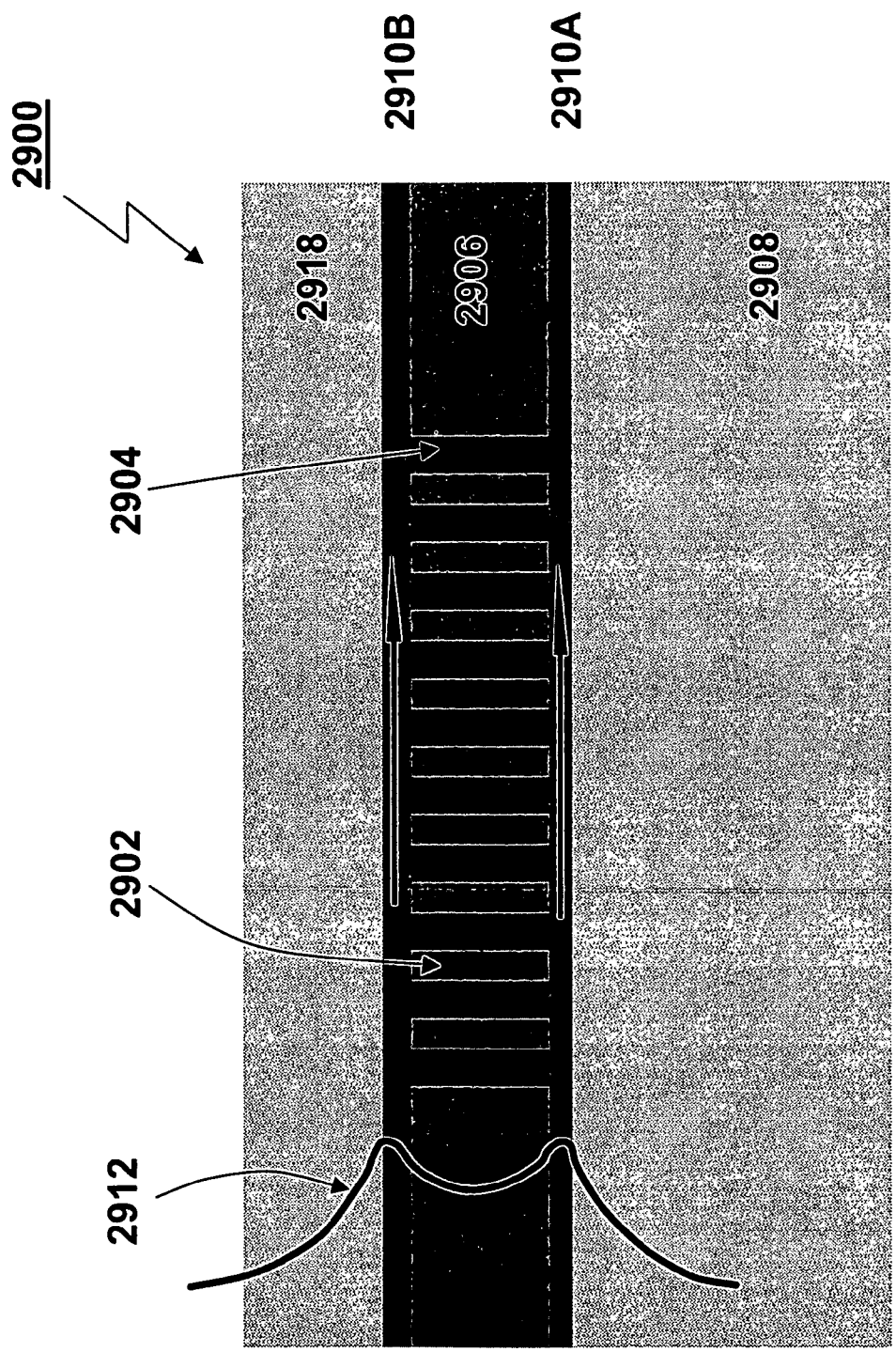
FIG. 29 shows a double cored cladding PC waveguide structure.

FIG. 29 illustrates an example of a double cored cladding PC waveguide structure 2900 in accordance with the present invention. The waveguide structure 2900 comprises a buffer layer 2908, a first thin core layer 2910A, an inter-core cladding layer 2906, a second thin core layer 2910B, and a capping layer 2918. Sub-regions 2904 are formed in the cladding layer 2906 but not in either of the core layers 2910A,2910E. The field profile 2912 varies according to whether a core/cladding 2902 or a core/sub-region 2904 interface is experienced in the vertical direction. As it did in the single core embodiments, the presence of a core/sub-region interface 2904 pushes the field more tightly into the core layers while still maintaining strong confinement. It is noted that the inter-core cladding 2906 can be composed of an identical material to that of the buffer, capping or core layers. Alternatively, the inter-core cladding 2906 could comprise material different from any of the other layers.

Embodiments of the present invention may be deployed as photonic elements in many different applications. Photonic elements, including those of the present invention, maybe implemented in telecommunications systems, in biosensor devices, and in optical storage media.

Figure 30:
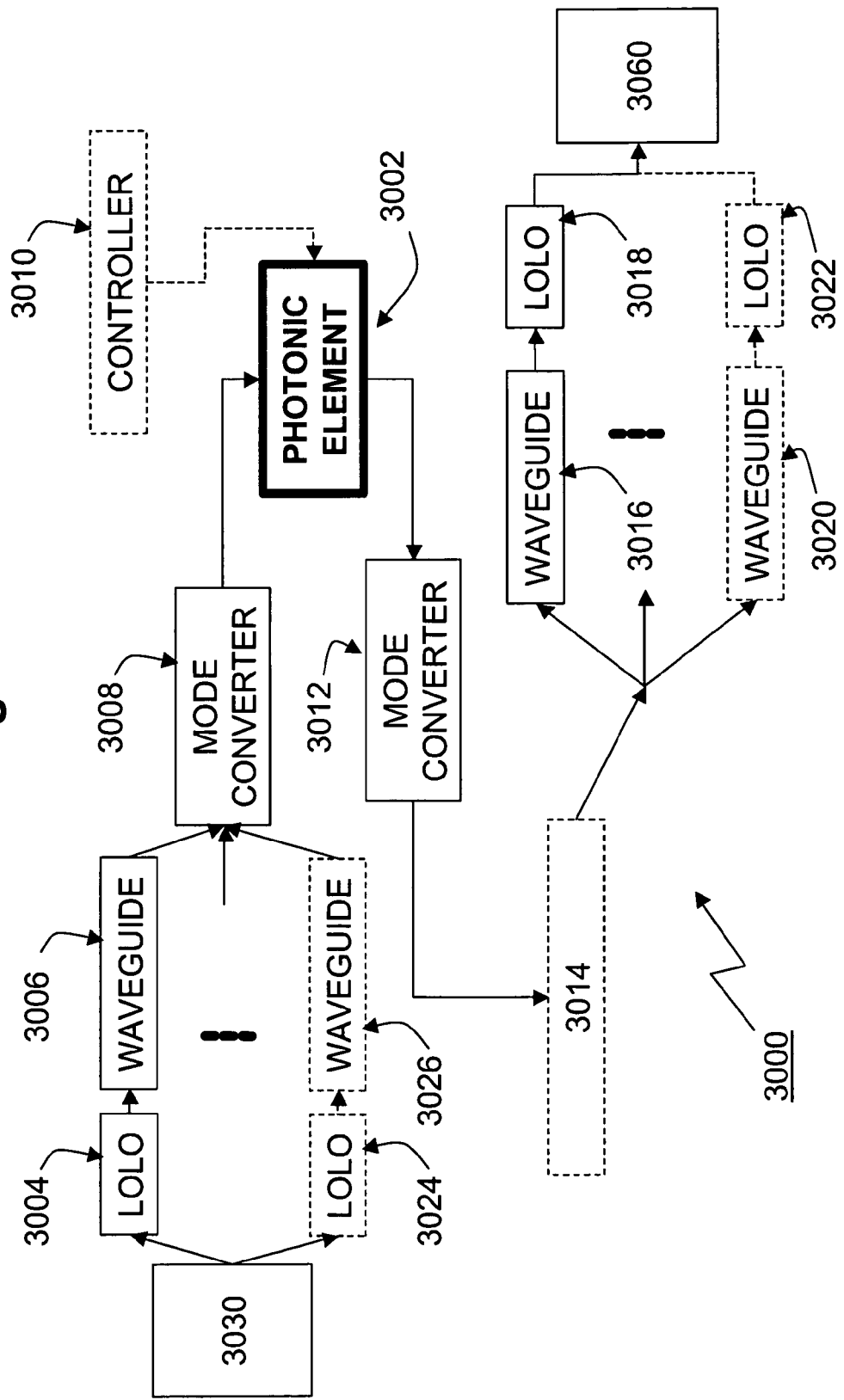
FIG. 30 shows schematically a photonic device incorporating a photonic element suitable for use in a telecommunications system.

FIG. 30 illustrates the general arrangement of a photonic device 3000 incorporating a photonic element 3002. The illustrated photonic device 3000 is suitable for use in a telecommunications system. A light signal typically propagates along a waveguiding structure 3050, such as an optical fibre. The photonic device 3000 includes: at least one Light On Light Off (LOLO) device 3004, 3024; at least one waveguide element 3006, 3026; a mode converter 3008; the photonic element 3002; a further mode converter 3012; at least one further waveguide element 3016,3020; and at least one further LOLO device 3018,3022.

The LOLO device 3004 couples the waveguiding structure 3050 to other components of the photonic device 3000, in the process converting the mode of the telecommunications waveguiding structure 3050 (which is typically large, approximately 8 mm in diameter) into a much smaller (approx. 1 to 2 mm in diameter) planar waveguide mode that can propagate along the photonic device 3002 with minimal loss. In many cases, several channels need simultaneous processing and multiple fibre inputs are provided.

Following the coupling of light from the external waveguiding structure 3050 to the photonic device 3002, horizontal confinement of the mode is commonly provided by at least one waveguide element 3006. Waveguide elements 3006 such as rib or ridge waveguides are often implemented in high refractive index contrast planar material systems. Other waveguide elements 3006 include waveguide splitters and bends. By means of these waveguide elements 3006 (defect state waveguides, ribs, ridges, splitters and/or bends), light from the LOLO device 3004 is transported from one region of the device to another.

The mode converter 3008 is required to provide efficient coupling of light from the waveguide into the photonic element 3002. Examples of wave converters include tapers, multi-mode interference slab couplers, and star couplers. Efficient coupling requires attention to appropriate propagation modes and angles in the photonic element 3002, in order to minimise reflections and loss from the interface of the element 3002. Following the conversion of the mode, the light is processed by, and propagates through, the photonic element 3002.

The operation of photonic element 3002 may be altered in a number of ways, including the application of an optical and/or an electrical control signal. The means for altering the operation of the photonic element 3002 is represented in the Figure as an (optional) controller element 300. Examples of suitable controller elements 3010 include optical control signal sources, electrical control signal sources, and optical pumps, depending on the functionality of the photonic element.

The mode is converted back again into a mode for propagation along the waveguide by the further mode converter 3012. Optionally, additional photonic elements 3014 can be inserted to provide extra functionality and to increase the integration capabilities of the photonic device. The additional photonic elements 3014, when provided, may be associated with a corresponding variety of connecting optical components, including further waveguide devices and/or splitters. As the reader will appreciate, the connecting optical components may themselves be formed as integrated photonic elements as well as conventional waveguides joining the photonic elements. The optional, additional photonic element feature in the Figure represents the presence of at least one photonic element and the concomitant connecting optical components in order to provide a highly integrated optical device.

Finally, at least one further waveguide element 3016 (ribs, ridges, splitters and/or bends) is used to guide the light along to the further LOLO device 3018. In this arrangement, the light is coupled back out into an output waveguiding structure 3060. Multiple waveguide elements 3016,3020 and LOLO devices 3018,3022 can be used for applications such as demultiplexers.

It is further noted that the further waveguide elements 3016,3020 and further LOLO devices 3018,3022 may be one and the same as the LOLO devices 3004,3024 and waveguide elements 3006,3026.

Figure 31:
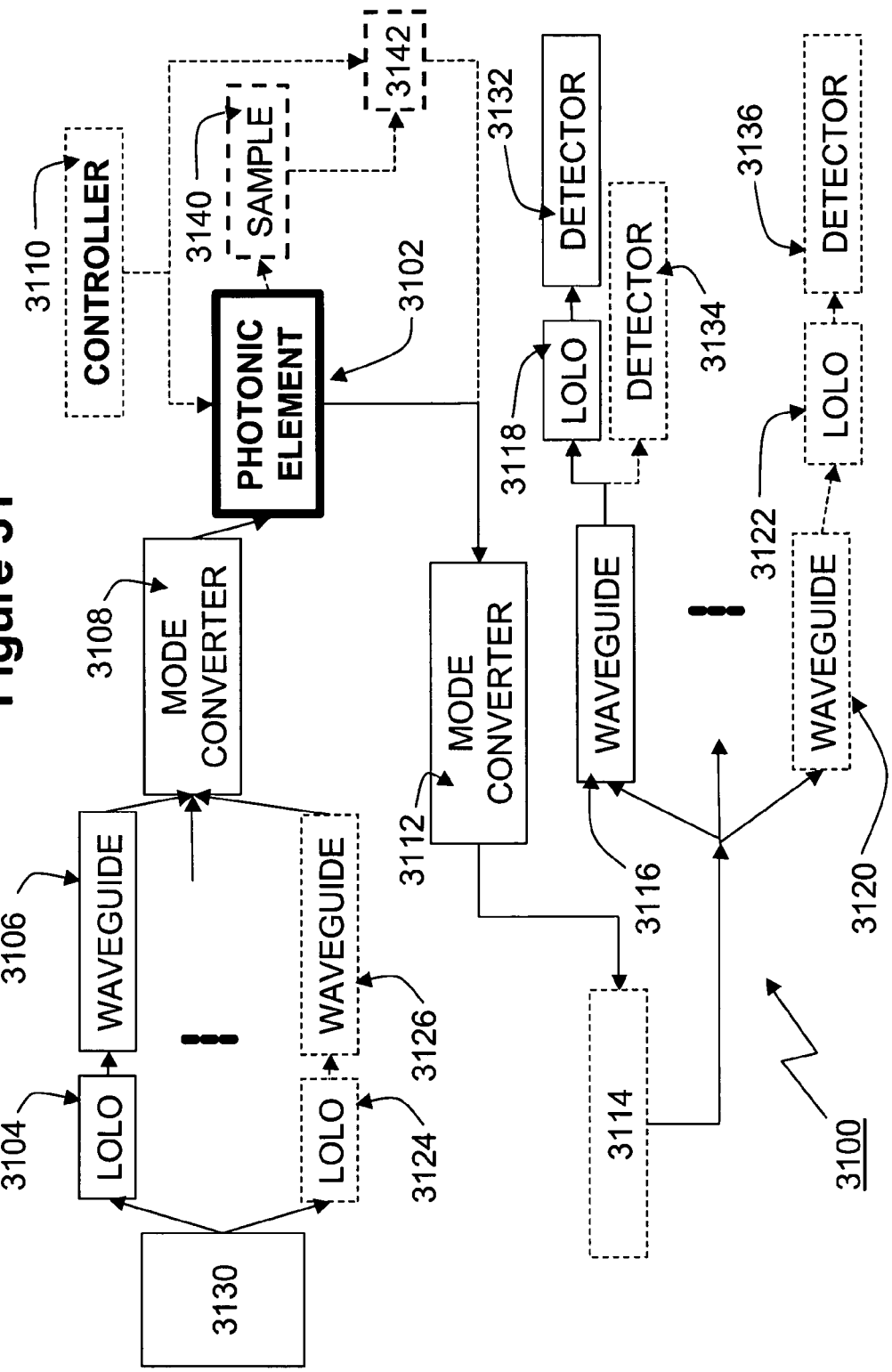
FIG. 31 shows schematically another photonic device incorporating a photonic element suitable for use in a biosensor arrangement; and, FIG. 32 shows schematically a further photonic device incorporating a photonic element suitable for use in an optical pick-up unit.

FIG. 31 illustrates the general arrangement of another photonic device 3100 incorporating a photonic element 3102. The illustrated photonic device 3100 is suitable for use in a biosensor arrangement.

The photonic device 3100 includes: at least one Light On Light Off (LOLO) device 3104, 3124; at least one waveguide element 3106, 3126; a mode converter 3108; the photonic element 3102; a further mode converter 3112; at least one further waveguide element 3116,3120; and at least one detector 3136,3134,3132.

Light from a light source 3130, for example a laser or a light emitting device (LED), is launched into the or each waveguide element 3106 via a corresponding LOLO device 3104. The launching of light could simply be end-facet coupling of the light into the waveguide 3106. Again, the waveguide element 3106, may include bends, splitters, ribs and/or ridge structured waveguides. The or each waveguide element 3106 is used to guide incoming light into different regions of the photonic device 3100 where illumination of different samples is performed.

The mode converter 3108 is required to provide efficient coupling of light from the waveguide into the photonic element 3102.

Preferably, the or each photonic element 3102 is itself provided with sample recesses for receiving at least one sample and illumination is performed inside the photonic element 3102. Alternatively, the photonic element 3102 is arranged to launch the light into at least one external biological sample 3140. In some examples of biosensor arrangements the sample is assayed not as a result of direct illumination but rather through the observed interaction of the evanescent field of light propagating in the photonic element 3102.

Illumination of biological and/or biochemical samples can result in characteristic luminescence properties, for example fluorescence or phosphorescence. In the preferred arrangement, light emitted from the or each sample is then collected at another portion of the photonic element 3102; whereas, in the external sample arrangement, light emitted from the or each sample is collected at another photonic element 3142.

The operation of photonic element 3102, and where present the other photonic element 3142, may be altered in a number of ways, including the application of an optical and/or an electrical control signal. The means for altering the operation of the photonic element 3102,3142 is represented in the Figure as an (optional) controller element 3110. Examples of suitable controller elements 3110 include optical control signal sources, electrical control signal sources, and optical pumps.

Following the collection of the light, the mode is converted into a mode for propagation along the waveguide by the further mode converter 3112. Filtering and possible wavelength separation can then be performed using additional integrated photonic elements 3114.

The processed light signal is then routed around at least one further waveguide element 3116 (ribs, ridges, splitters and/or bends) is used to guide the light along to at least one integrated detector 3134. Processed light may alternatively be routed externally, a further LOLO device 3118,3122 providing the interface with an external detector 3132,3136. Many applications require the use of multiple detectors in order to span a range of different wavelengths, for example Raman Spectroscopy, or in order to distinguish between different samples.

Figure 32:
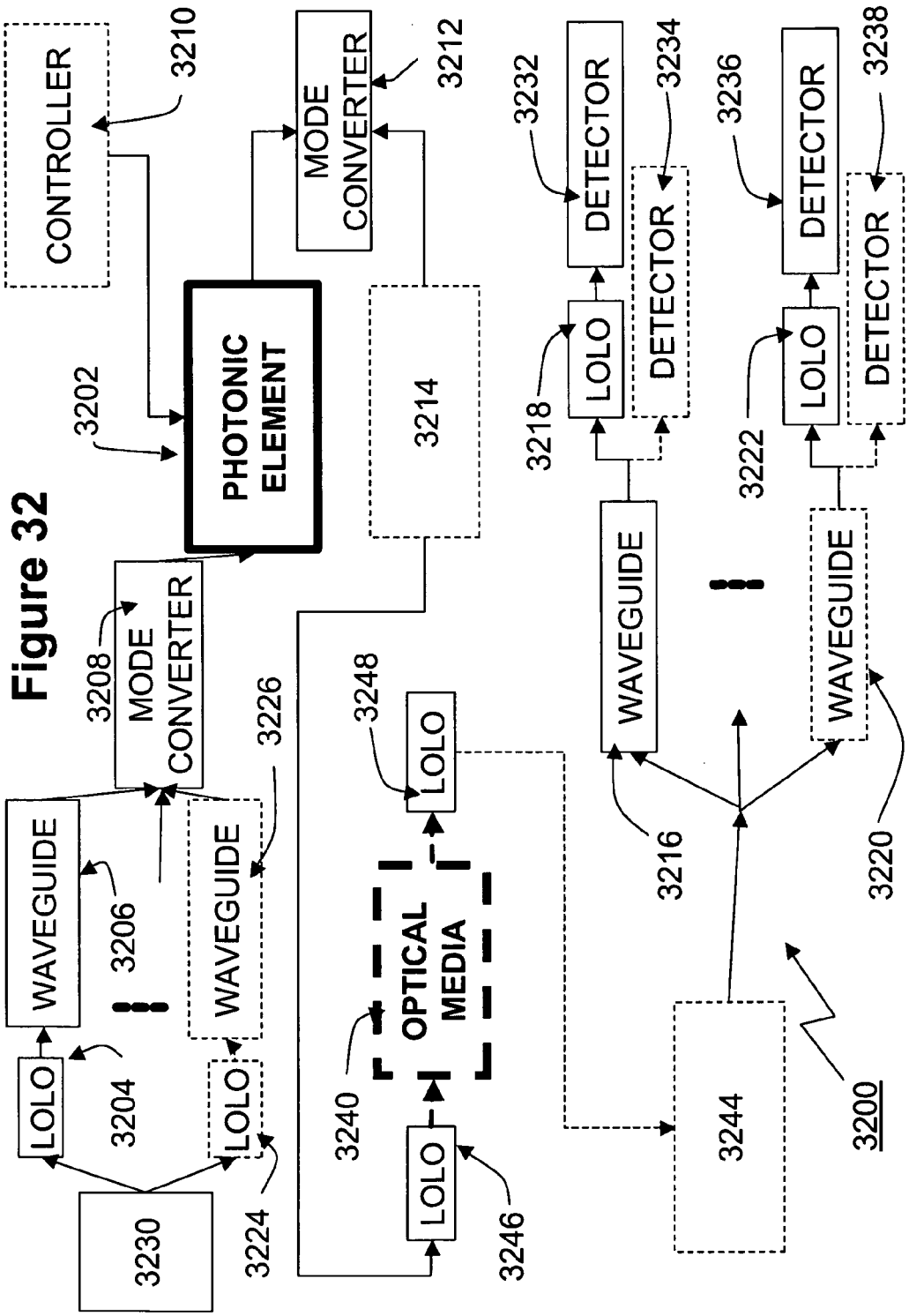

FIG. 32 also illustrates the general arrangement of a photonic device 3200 incorporating a photonic element 3202. The illustrated photonic device 3200 is suitable for use in an optical pick-up unit, such as an optical disc reading head.

The photonic device 3200 includes: at least one Light On Light Off (LOLO) device 3204, 3224; at least one waveguide element 3206, 3226; a mode converter 3208; the photonic element 3202; a further mode converter 3212; at least one further waveguide element 3216,3220; and at least one integrated detector 3234,3238.

Light from a light source 3230, for instance a modulated laser or LED source, is launched into the photonic device 3200 by the LOLO element 3204. Although not illustrated, light can also be coupled into the photonic device 3200 from an external waveguiding structure, such as an optical fibre.

Light from the LOLO element 3204 is coupled into the waveguide element 3206. The waveguide element 3206, may include bends, splitters, ribs and/or ridge structured waveguides. The or each waveguide element 3206 is used to guide incoming light into different regions of the photonic device 3200.

A mode converter 3208 is required to provide efficient coupling of light from the waveguide element 3206 into the photonic element 3202. The photonic element 3202 processes the light, for example it may serve to filter, compensate for dispersion, focus, align or modulate the incoming light.

The operation of photonic element 3202, and where present the other photonic elements 3214,3244, may be altered in a number of ways, including the application of an optical and/or an electrical control signal. The means for altering the operation of the photonic element 3202,3214, 3244 is represented in the Figure as an (optional) controller element 3210. Examples of suitable controller elements 3210 include optical control signal sources, electrical control signal sources, and optical pumps.

The processed light output by the photonic element 3202 is converted into a mode for propagation along the waveguide by the further mode converter 3212. Filtering and possible wavelength separation can then be performed using additional integrated photonic elements 3214.

The light is propagated into a LOLO element 3246 where the light is focussed onto an optical storage medium 3240. The light is collected back again using another LOLO element 3248 where it is processed again with at least one further integrated photonic element 3244. The further integrated photonic element 3244 includes photonic "building block" elements, for example dispersion compensators, focussing elements, filters and amplifiers.

The processed light from further integrated photonic element 3244 is then coupled to at least one waveguide component 3216 (ribs, ridges, splitters and/or bends) and thereby projected onto a detector 3232,3234,3236,3238 which can either be in the plane of the waveguide or external to the waveguide (hence requiring a LOLO element 3218, 3222).

It is possible to introduce a clearance between the cladding/buffer PCs and the core. Generally, clearances are a result of etching to a predetermined depth through the cladding layer. Etching may be either dry etching or wet etching although dry etching is preferable. The etch depth will determine the final clearance between the core and the cladding/buffer PC sub-regions. An increase in the clearance corresponds to a reduction in the effective mode index perturbation experienced in the thin cores. This provides narrower bandgaps and weaker extinction ratios for the same amount of rods, thereby providing an extra factor for fine tuning the dispersion relation features.

We claim:

1. A planar waveguide structure comprising:
 a core layer having a first refractive index, $n_{core}$, and no photonic band structure; and
 a cladding layer, said cladding layer having first and second opposing external surfaces, said first surface contiguous with a first surface of said core layer, the cladding layer comprising:
  a first region having a first refractive index, $n_{cladding}$, where $n_{core} > n_{cladding}$; and
  a plurality of sub-regions formed in said first region, said sub-regions having a second refractive index, $n_{sub}$, the sub-regions arranged in an array in a plane, said plane parallel to said first surface, each sub-region extending from said second surface of said cladding layer in a direction perpendicular to said plane, wherein the array of sub-regions comprises a photonic band structure in a region of said cladding, for perturbing only an evanescent field of an optical signal propagating through the core layer wherein an effective mode index contrast experienced by the optical signal propagating adjacent the cladding photonic band structure region is greater than 0.1 percent.

2. A waveguide structure as claimed in claim 1, wherein the first region is formed of a $SiO_2$ glass.

3. A waveguide structure as claimed in claim 1, wherein the sub-regions are air filled holes.

4. A waveguide structure as claimed in claim 1, wherein the sub-regions are formed from silicon.

5. A waveguide structure as claimed in claim 1, wherein the sub-regions are arranged in a one dimensional array.

6. A waveguide structure as claimed in claim 1, wherein the sub-regions are arranged in a two dimensional array.

7. A waveguide structure as claimed in claim 1, further comprising a buffer layer disposed adjacent a second surface of the core layer, the buffer layer comprising a first buffer region having a third refractive index $n_{buffer}$, wherein $n_{core} > n_{buffer}$.

8. A waveguide structure as claimed in claim 7, wherein the buffer layer further comprises a plurality of buffer sub-regions having a fourth refractive index $n_{buf\_sub}$, said buffer sub-regions arranged in an array in a plane parallel to said second surface of said core layer, each of said buffer sub-regions extending in a direction perpendicular to said second surface, wherein the array of buffer sub-regions comprises a photonic band structure in a region of the buffer layer for perturbing an evanescent field of said optical signal propagating through the core layer, wherein an effective mode index contrast experienced by the optical signal propagating adjacent the buffer photonic band structure region is greater than 0.1 percent.

9. A waveguide structure as claimed in claim 8, wherein the first buffer region is formed of a $SiO_2$ glass.

10. A waveguide structure as claimed in claim 8, wherein the buffer sub-regions are air filled holes.

11. A waveguide structure as claimed in claim 8, wherein the buffer sub-regions are formed from silicon.

12. A waveguide structure as claimed in claim 8, wherein the buffer sub-regions are arranged in a one dimensional array.

13. A waveguide structure as claimed in claim 8, wherein the buffer sub-regions are arranged in a two dimensional array.

14. A waveguide structure as claimed in claim 8, wherein the cladding layer is formed of a first material and the buffer layer is formed of a second material, and wherein the first material has a higher refractive index than the second material.

15. A waveguide structure as claimed in claim 1, wherein at least one defect region is formed in the cladding layer, the defect region permitting the propagation of an optical signal unimpeded by the photonic band structure.

16. A waveguide structure as claimed in claim 15, wherein said defect region comprises a region where cladding sub-regions penetrate to a first depth into the cladding layer and wherein cladding sub-regions penetrate to a second depth into the cladding layer in regions of the cladding layer beyond said defect region, the first depth differing substantially from the second depth.

17. A waveguide structure as claimed in claim 15, wherein the defect region is substantially free of sub-regions and wherein cladding sub-regions penetrate to a predetermined depth into the cladding layer in regions of the cladding layer beyond said defect region.

18. A waveguide structure as claimed in claim 15, further comprising a conductive contact, wherein a potential is imposed across said defect region in order to tune the defect state.

19. A planar waveguide structure comprising:
a core layer having a first refractive index, $n_{core}$, and no photonic band structure; and
a cladding layer, said cladding layer having first and second opposing external surfaces, said first surface contiguous with a first surface of said core layer, the cladding layer comprising:
a first region having a first refractive index, $n_{cladding}$, where $n_{core} > n_{cladding}$; and
a plurality of sub-regions formed in said first region, said sub-regions having a second refractive index, $n_{sub}$, the sub-regions arranged in a two-dimensional array in a plane, said plane parallel to said first surface, each sub-region extending from said second surface of said cladding layer in a direction perpendicular to said plane, wherein the array of sub-regions comprises a photonic band structure in a region of the cladding for perturbing only an evanescent field of an optical signal propagating through the core layer adjacent the cladding photonic band structure region.

20. A waveguide structure as claimed in claim 19, wherein the sub-regions are air filled holes.

21. A waveguide structure as claimed in claim 19, wherein the sub-regions are formed from silicon.

22. A waveguide structure as claimed in claim 19, the structure further comprising a buffer layer disposed adjacent a second surface of said core layer, the buffer layer comprising a first buffer region having a third refractive index $n_{buffer}$, wherein $n_{core} > n_{buffer}$.

23. A waveguide structure as claimed in claim 22, wherein the buffer layer further comprises a plurality of buffer sub-regions having a fourth refractive index $n_{buf\_sub}$, said buffer sub-regions arranged in a two dimensional array in a plane parallel to said second surface of said core layer, each of said buffer sub-regions extending in a direction perpendicular to said second surface, wherein the array of buffer sub-regions comprises a photonic band structure in a region of the buffer layer for perturbing only an evanescent field of the optical signal propagating through the core layer adjacent the buffer photonic band structure region.

24. A waveguide structure as claimed in claim 23, wherein the buffer sub-regions are air filled holes.

25. A waveguide structure as claimed in claim 23, wherein the buffer sub-regions are formed from silicon.

26. A waveguide structure as claimed in claim 23, wherein the cladding layer is formed of a first material and the buffer layer is formed of a second material, and wherein the first material has a higher refractive index than the second material.

27. A waveguide structure as claimed in claim 19, wherein at least one defect region is formed in the cladding layer, the defect region permitting the propagation of an optical signal unimpeded by the photonic band structure region.

28. A waveguide structure as claimed in claim 27, wherein said defect region comprises a region where cladding sub-regions penetrate to a first depth into the cladding layer and wherein cladding sub-regions penetrate to a second depth into the cladding layer in regions of the cladding layer beyond said defect region, the first depth differing substantially from the second depth.

29. A waveguide structure as claimed in claim 27, wherein the defect region is substantially free of sub-regions and wherein cladding sub-regions penetrate to a predetermined depth into the cladding layer in regions of the cladding layer beyond said defect region.

30. A waveguide structure as claimed in claim 27, further comprising a conductive contact, wherein a potential is imposed across said defect region in order to tune the defect state.

31. A planar waveguide structure comprising:
   a core layer having a first refractive index, $n_{core}$, and no photonic band structure;
   a cladding layer, said cladding layer having first and second opposing external surfaces, said first surface of said cladding layer contiguous with a first surface of said core layer; and
   a buffer layer disposed adjacent a second surface of said core layer; wherein the cladding layer comprises:
      a first region having a first refractive index, $n_{cladding}$, where $n_{core} > n_{cladding}$; and
      a plurality of sub-regions formed formed in said first region, said sub-regions having a second refractive index, $n_{sub}$, the buffer layer having a third refractive index, $n_{buffer}$, wherein $n_{cladding} > n_{buffer}$, and a field profile of an optical signal propagating through the core layer is asymmetric with respect to the core layer, the sub-regions in the cladding layer arranged in an array in a plane which is parallel to said first surface of the core layer, said cladding layer sub-regions extending from said second surface of said cladding layer in a direction perpendicular to said first surface, and the array of sub-regions comprises a photonic band region for perturbing an evanescent field of the optical signal as said optical signal propagates adjacent the cladding photonic band structure region.

32. A method of manufacturing planar waveguide structures having a core layer and a cladding layer, said cladding layer having first and second opposing external surfaces, said first surface of said cladding layer contiguous with a first surface of said core layer, said core layer having a first refractive index, $n_{core}$, and no photonic band structure, the method comprising the steps of:
   forming a first region in said cladding layer, said first region having a first refractive index $n_{cladding}$, where $n_{core} > n_{cladding}$; and
   forming an array of sub-regions in said cladding region, said sub-regions having a second refractive index $n_{sub}$ in a plane that is parallel to the first surface of the core layer, each said sub-region extending from said second surface of said cladding layer in a direction perpendicular to said plane, wherein the array of sub-regions comprises a photonic band structure in a region of the cladding layer for perturbing only an evanescent field of an optical signal propagating through the core layer wherein an effective mode index contrast experienced by the optical signal passing adjacent the cladding photonic band structure region is greater than 0.1 percent.

33. A method as claimed in claim 32, wherein the step of forming the array of sub-regions includes etching the sub-regions.

34. A method as claimed in claim 33, wherein the step of forming the array of sub-regions further includes allowing air to fill the etched sub-regions.

35. A method as claimed in claim 33, wherein the step of forming the array of sub-regions further includes filling the etched regions with a filler material that has a higher refractive index than air.

36. A method as claimed in claim 35, wherein the filler material is silicon.

37. A method as claimed in claim 32, wherein the array of sub-regions is a one dimensional array.

38. A method as claimed in claim 32, wherein the array of sub-regions is a two dimensional array.

39. A method as claimed in claim 32, wherein the waveguide structures have a buffer layer disposed adjacent a second surface of the core layer, the buffer layer comprising a first buffer region having a third refractive index $n_{buffer}$, where $n_{core} > n_{buffer}$.

40. A method as claimed in claim 39, wherein the method further comprises the step of:
   forming an array of buffer sub-regions having a fourth refractive index $n_{buf\_sub}$, within an upper portion of the buffer layer in a plane parallel to the second surface of said core layer, each of said buffer sub-regions extending in a direction perpendicular to said second surface, wherein the array of buffer sub-regions comprises a buffer photonic band structure in a region of the buffer layer for perturbing an evanescent field of an optical signal propagating through the core layer wherein an effective mode index contrast experienced by the optical signal propagating adjacent the buffer photonic band structure region is greater than 0.1 percent.

41. A method as claimed in claim 40, wherein the step of forming the array of buffer sub-regions includes etching the buffer sub-regions.

42. A method as claimed in claim 41, wherein the step of forming the array of buffer sub-regions further includes allowing air to fill the etched buffer sub-regions.

43. A method as claimed in claim 41, wherein the step of forming the array of buffer sub-regions further includes filling the etched buffer sub-regions with a filler material that has a higher refractive index than air.

44. A method as claimed in claim 43, wherein the filler material is silicon.

45. A method as claimed in claim 40, wherein the array of buffer sub-regions is a one dimensional array.

46. A method as claimed in claim 40, wherein the array of buffer sub-regions is a two dimensional array.

47. A method as claimed in claim 39, wherein the cladding layer is formed of a first material and the buffer layer is formed of a second material, and wherein the first material has a higher refractive index than the second material.

48. A method as claimed in claim 32, the method further comprising the step of forming at least one defect region in the cladding layer, the defect region permitting the propagation of an optical signal unimpeded by the photonic bandgap structure region.

49. A method as claimed in claim 48, wherein the step of forming at least one defect region includes the substeps of:
   forming cladding sub-regions having a first depth in the defect region; and
   forming cladding sub-regions having a second depth in regions of the cladding layer beyond said defect region, the first depth differing substantially from the second depth.

50. A method as claimed in claim 48, wherein the defect region is substantially free of sub-regions and wherein cladding sub-regions penetrate to a predetermined depth into the cladding layer in regions of the cladding layer beyond said defect region.

51. A method as claimed in claim 48, further comprising the step of providing a conductive contact, which imposes a potential across said defect region in order to tune the defect state.

52. A method of guiding an optical signal comprising the step of passing an optical signal through a waveguiding region of a planar optical waveguide structure comprising a core layer and a cladding layer, said cladding layer having first and second opposing external surfaces, said first surface of said cladding layer contiguous with a first surface of said core layer, said core layer having a first refractive index, $n_{core}$, and no photonic band structure, wherein the cladding layer comprises a first region having a first refractive index $n_{cladding}$, where $n_{core} > n_{cladding}$, and a plurality of sub-regions in said first region having a second refractive index $n_{sub}$, said sub-regions arranged in a plane, said plane is parallel to said first surface, each of said sub-regions extending from said second surface of said cladding layer in a direction perpendicular to said plane, and wherein the array of sub-regions comprises a photonic band structure within a region of the cladding layer causing a contrast in effective mode index adjacent the cladding photonic band structure region between the first region and the sub-regions which perturbs only an evanescent field of the optical signal propagating through the core layer.

* * * * *